United States Patent
Kumisuwa et al.

(10) Patent No.: US 8,099,310 B2
(45) Date of Patent: Jan. 17, 2012

(54) MAINTENANCE SCHEDULING SYSTEM, MAINTENANCE SCHEDULING METHOD, AND IMAGE FORMING APPARATUS

(75) Inventors: Yoshikatsu Kumisuwa, Tokyo (JP); Rintaro Nakane, Yokohama (JP); Hiroyo Katou, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 526 days.

(21) Appl. No.: 12/370,137

(22) Filed: Feb. 12, 2009

(65) Prior Publication Data

US 2009/0210278 A1    Aug. 20, 2009

Related U.S. Application Data

(60) Provisional application No. 61/029,874, filed on Feb. 19, 2008, provisional application No. 61/029,876, filed on Feb. 19, 2008, provisional application No. 61/036,581, filed on Mar. 14, 2008.

(51) Int. Cl.
*G06Q 10/00* (2006.01)
(52) U.S. Cl. ..................................... 705/7.12
(58) Field of Classification Search ............... 705/7.12
See application file for complete search history.

(56) References Cited

U.S. PATENT DOCUMENTS

| | | | |
|---|---|---|---|
| 2005/0149570 A1* | 7/2005 | Sasaki et al. | 707/104.1 |
| 2007/0225850 A1 | 9/2007 | Kamisuwa et al. | |
| 2008/0002995 A1 | 1/2008 | Kamisuwa et al. | |
| 2008/0062211 A1 | 3/2008 | Kamisuwa et al. | |
| 2009/0132321 A1 | 5/2009 | Kamisuwa et al. | |

FOREIGN PATENT DOCUMENTS

JP    2007-004298    1/2007

OTHER PUBLICATIONS

Rosch, Winn L. "The Cost of Consumables is Anything But Constant (Laser-Printer Cartidges, Toner, Paper Supplies)" PC Week v7, n8, p. 106. Feb. 26, 1990.*

* cited by examiner

*Primary Examiner* — John Hayes
*Assistant Examiner* — Allen J Jung
(74) *Attorney, Agent, or Firm* — Turocy & Watson, LLP

(57) ABSTRACT

A maintenance scheduling system that lays out a maintenance schedule for an image forming apparatus includes an actual-use-result acquiring unit that acquires actual use result information of consumables, a failure-probability-distribution estimating unit that estimates failure probability distributions of the consumables, a cost-related-constant acquiring unit that acquires cost related constants of the consumables, a first cost calculating unit that calculates, for each of plural visit interval values, cost per unit time required for the image forming apparatus, a visit-interval calculating unit that calculates the visit interval value giving minimum cost, a second cost calculating unit that calculates, for each of plural replacement interval values, cost per unit time required for the image forming apparatus, a replacement-interval calculating unit that calculates a calculated replacement interval value, and a maintenance-schedule presenting unit that presents the next visit time and at least one of the consumables to be replaced in the visit.

19 Claims, 27 Drawing Sheets

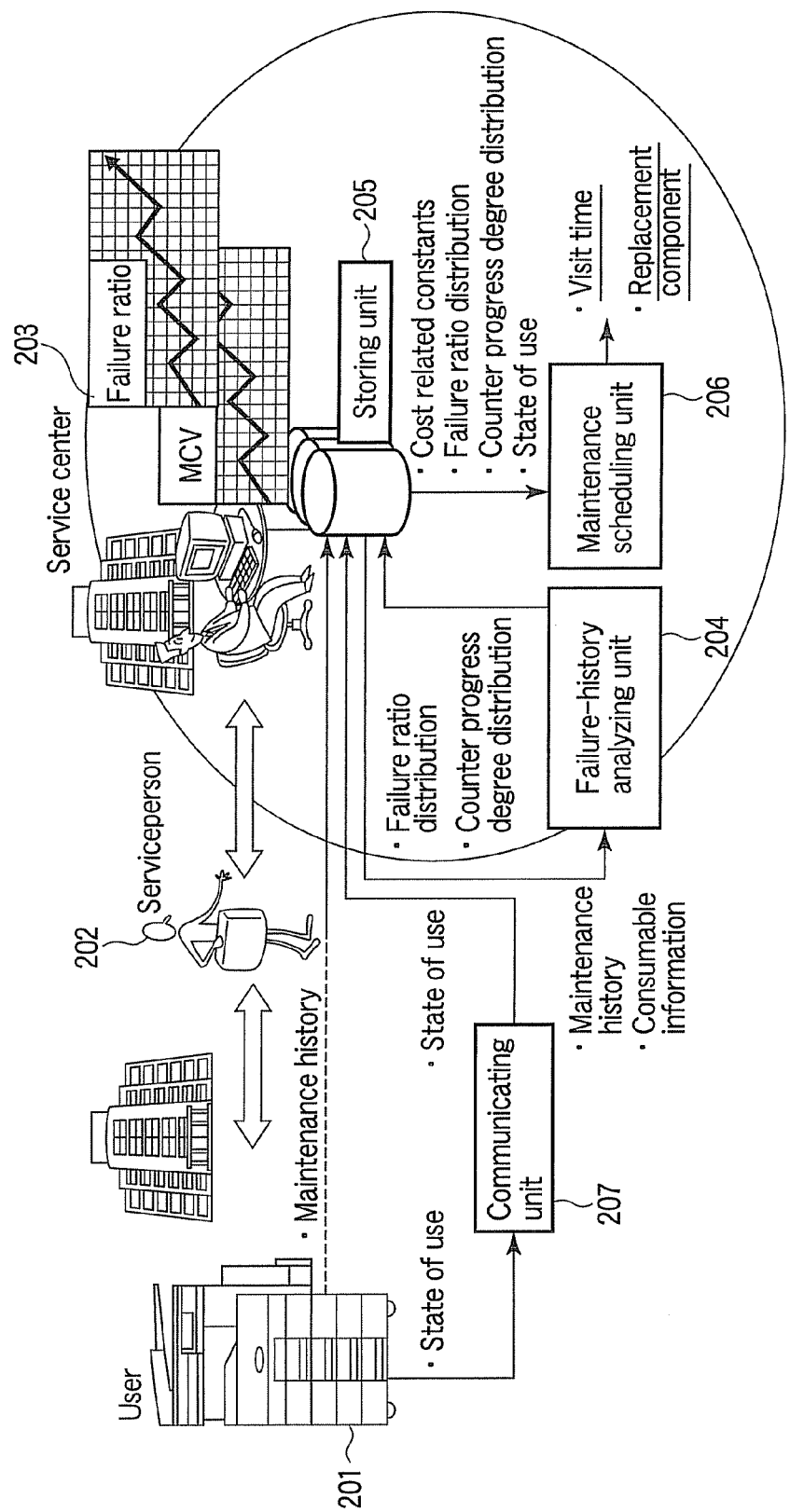
F I G. 2

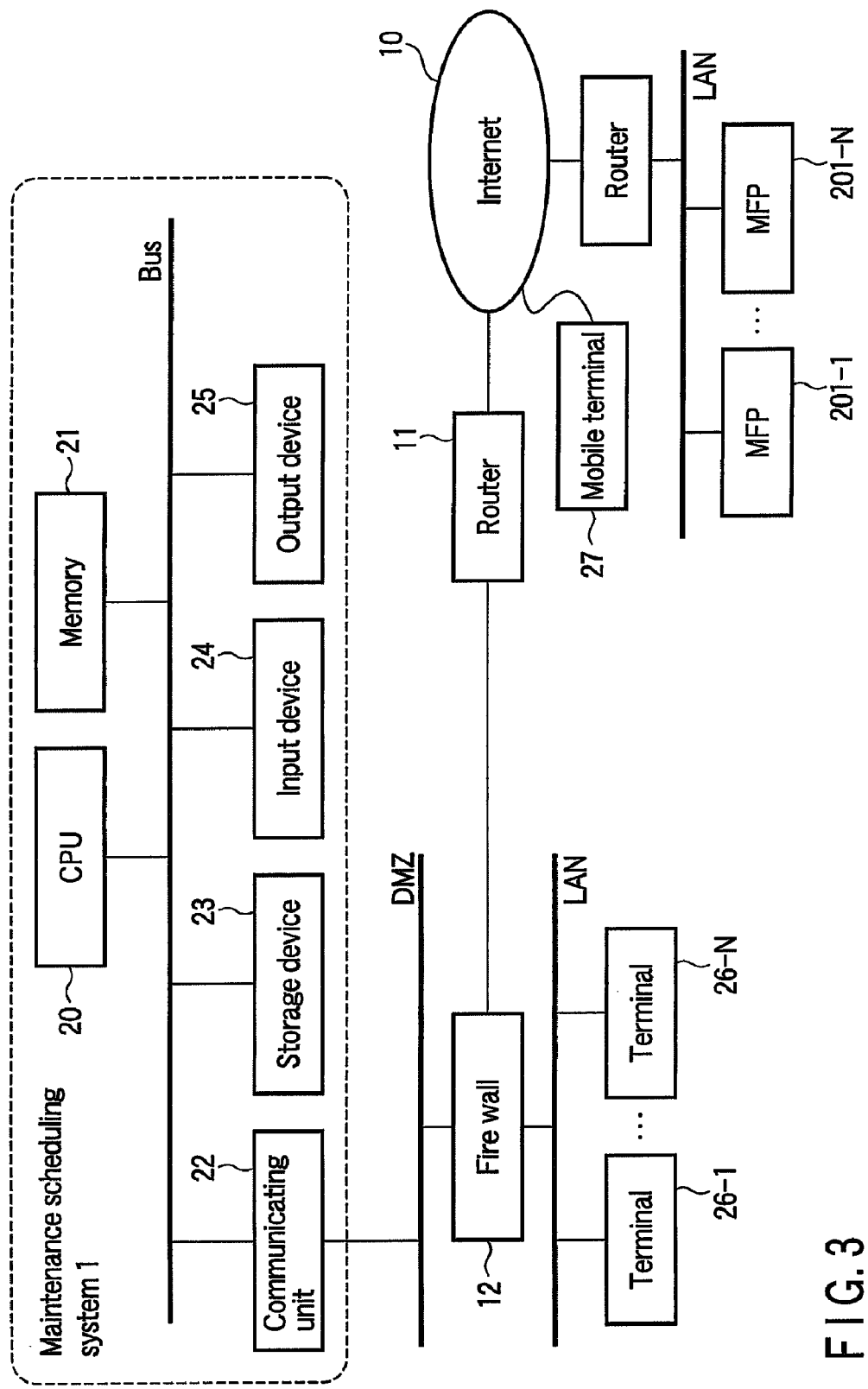
F I G. 3

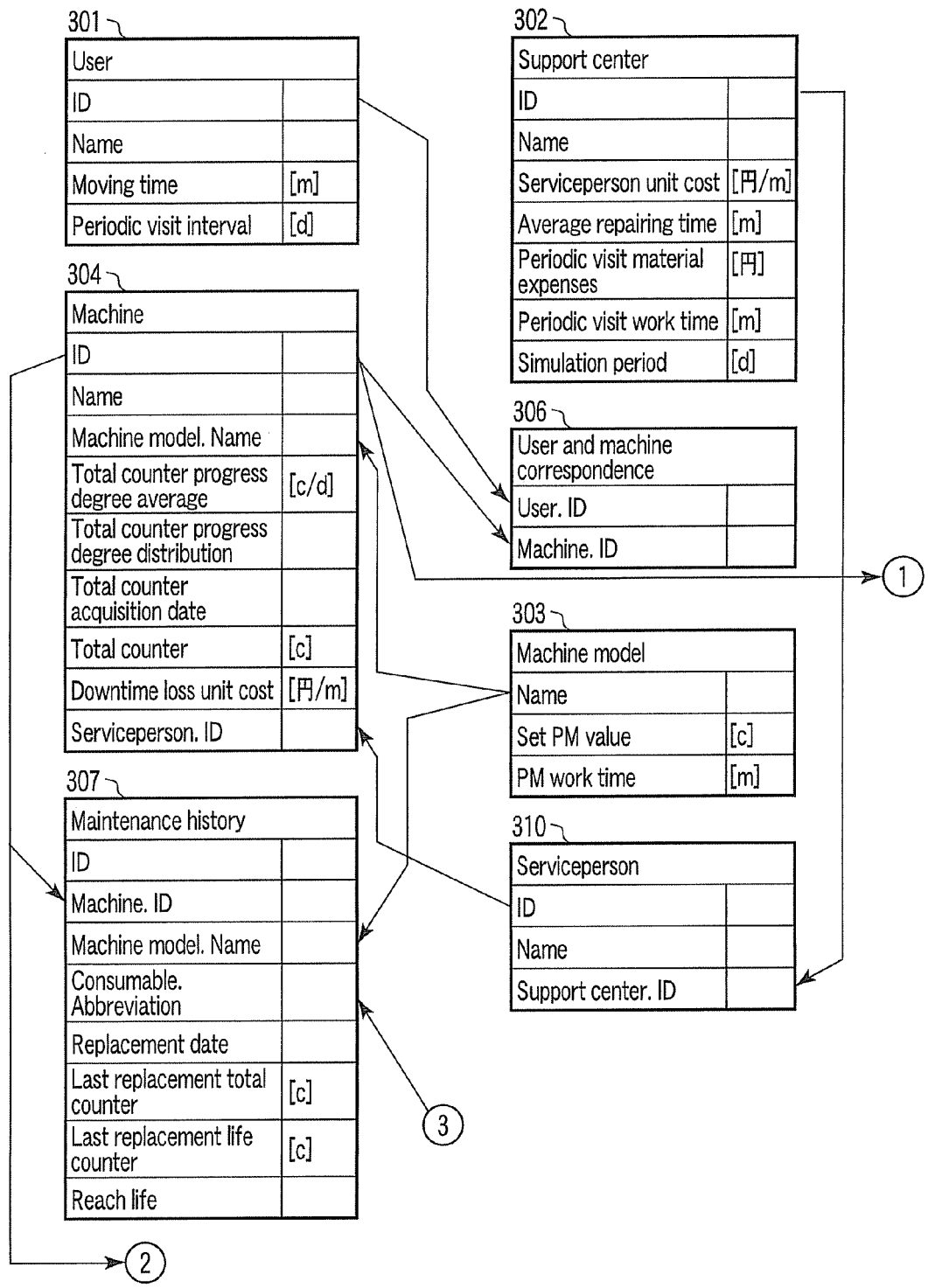
F I G. 4A

| | Last replacement date | Last replacement total count | Last replacement life count | Reach life |
|---|---|---|---|---|
| Photoconductive drum | 2006/10/28 | 500,567 | 812,540 | A |
| Feed roller 1 | 2006/10/28 | 340,101 | 213,107 | B |
| Developer | 2006/10/28 | 834,478 | 1,012,259 | A |
| Fixing roller 1 | 2006/10/28 | 380,074 | 415,602 | B |
| ... | | | | |
| Transfer belt | 2006/10/28 | 500,567 | 692,236 | A |

F I G. 5

| Machine. ID | Machine model. name | Consumable. Abbreviation | Replacement date | Last replacement total counter | Last replacement life counter | Reach life |
|---|---|---|---|---|---|---|
| 100213 | Machine model A | Photoconductive drum | 2003/4/7 | 241052 | 356982 | B |
| 100213 | Machine model A | Photoconductive drum | 2003/4/21 | 40074 | 70250 | B |
| 102399 | Machine model A | Photoconductive drum | 2002/11/15 | 33466 | 45682 | B |
| 102399 | Machine model A | Photoconductive drum | 2002/11/20 | 1012 | 3022 | B |
| 102399 | Machine model A | Photoconductive drum | 2002/11/22 | 1084 | 2989 | B |
| 102399 | Machine model A | Electrification charger wire | 2003/5/29 | 7546 | 8520 | B |
| 102512 | Machine model A | Photoconductive drum | 2003/5/23 | 516504 | 415369 | A |
| 102512 | Machine model A | Developing device | 2003/5/23 | 516504 | 512036 | A |
| 102512 | Machine model A | Fixing roller 1 | 2003/5/23 | 516504 | 345026 | A |
| 102512 | Machine model A | Fixing roller 1 | 2003/5/24 | 50 | 55 | B |
| 112240 | Machine model A | Photoconductive drum | 2003/5/7 | 12356 | 12356 | B |
| 139855 | Machine model B | Photoconductive drum | 2003/7/14 | 305552 | 523690 | A |
| 139855 | Machine model B | Feed roller 1 | 2003/7/23 | 305689 | 522 | B |

F I G. 6

| Machine model. Name | Abbreviation | Failure distribution classification | Failure distribution parameter 1 | Failure distribution parameter 2 | Failure distribution parameter 3 |
|---|---|---|---|---|---|
| Machine model A | Photoconductive drum | 0 | 3.2 | 623K | — |
| Machine model A | Feed roller | 0 | 5.1 | 500K | — |
| Machine model A | Transfer belt | 0 | 1.2 | 821K | — |
| Machine model B | Photoconductive drum | 0 | 1.5 | 790K | — |
| Machine model B | Feed roller | 0 | 5.3 | 520K | — |

F I G. 7

| Machine. ID | Consumable. Abbreviation | Life counter acquisition date | Life counter |
|---|---|---|---|
| 100213 | Photoconductive drum | 2004/1/26 | 1025392 |
| 100213 | Photoconductive drum | 2004/1/27 | 1025401 |
| 100213 | Photoconductive drum | 2004/1/28 | 1027012 |
| ∼ | | | |
| 100213 | Feed roller | 2004/1/27 | 1276511 |
| 100213 | Feed roller | 2004/1/28 | 1279732 |
| ∼ | | | |
| 102400 | Photoconductive drum | 2004/1/28 | 2697196 |
| ∼ | | | |

FIG. 8

| ID | Counter progress degree average | Counter progress degree distribution | Counter acquisition date | Total counter |
|---|---|---|---|---|
| 100213 | 2634 | 1815 | 2004/1/28 | 1027012 |
| 102399 | 4565 | 3212 | 2004/1/13 | 1279732 |
| 102400 | 6012 | 3604 | 2004/1/28 | 2697196 |

FIG. 9

| Machine. ID | Consumable. Abbreviation | Life counter progress degree average | Life counter progress degree distribution | Life counter acquisition date | Life counter |
|---|---|---|---|---|---|
| 102399 | Photoconductive drum | 2634 | 1815 | 2004/1/13 | 560012 |
| 102399 | Electrification charger wire | 4565 | 3212 | 2004/1/13 | 669542 |
| 102399 | Transfer belt | 6012 | 3604 | 2004/1/13 | 669852 |
| 112400 | Photoconductive drum | 5647 | 950 | 2004/1/28 | 2697196 |
| 112400 | Electrification charger wire | 9310 | 1502 | 2004/1/28 | 1692331 |

F I G. 10

| | Visit interval | Replacement interval |
|---|---|---|
| Photoconductive drum | 610K | 550K |
| Feed roller | 400K | 350K |
| Developer | 880K | 820K |
| Fixing roller 1 | 410K | 350K |
| ... | | |
| Transfer belt | 750K | 720K |

January 24, 2006 (tue)

Machine serial number : 100213

——Optimum maintenance schedule    Calculation result——

Next visit date :          February 23, 2006 (thu)

Replacement component : Photoconductive drum, fixing roller 1, fixing roller 2

FIG. 16

| Machine. ID | Optimum visit date | Replacement consumable list |
|---|---|---|
| 100213 | 2006/9/5 | PM |
| ~ | | |
| 102399 | 2006/9/11 | Photoconductive drum |
| 102400 | 2006/9/26 | PM |
| | | Photoconductive drum |
| | | Cleaning roller |
| | | Heat roller |
| | | Drum cleaning blade |
| | | Electrification charger grid |
| | | Drum peeling pawl |
| | | Pressing roller |
| ~ | | |
| 103560 | 2006/9/15 | PM |
| | | Photoconductive drum |
| | | Heat roller |
| | | Pressing roller |
| ~ | | |

FIG. 18

| User. ID | Machine. ID |
|---|---|
| A00012 | 100213 |
| A00012 | 100214 |
| A00012 | 101501 |
| A00015 | 200098 |
| A00018 | 301208 |
| A00018 | 100218 |
| A00018 | 200035 |
| A00018 | 200036 |
| ~ | |

Image of cost and risk

| | Visit interval | | | Replacement interval |
|---|---|---|---|---|
| | Optimum | Lower limit | Upper limit | |
| Photoconductive drum | 610K | 600K | 620K | 550K |
| Feed roller | 400K | 390K | 410K | 350K |
| Developer | 880K | 870K | 900K | 820K |
| Fixing roller 1 | 410K | 400K | 420K | 350K |
| ... | | | | |
| Transfer belt | 750K | 740K | 770K | 720K |

January 24, 2006 (tue)

Machine serial number : 100213

——Optimum visit date calculation result——

Optimum visit date : February 23, 2006 (thu)

Visit date lower limit : February 10, 2006 (fri)
Visit date upper limit : March 1, 2006 (wed)

——Input visit date——

| February 23, 2006 (thu) ▽ |   | Calendar | Decide |

F I G. 26

January 24, 2006 (tue)

Machine serial number : 100213

——Maintenance schedule calculation result——

Next visit date : February 24, 2006 (fri)

Replacement components : Photoconductive drum, fixing roller 1, fixing roller 2

Optimum visit date : February 23, 2006 (thu)
Visit date lower limit : February 10, 2006 (fri)
Visit date upper limit : March 1, 2006 (wed)

F I G. 27

F I G. 30

| Machine. ID | Optimum visit date | Visit date lower limit | Visit date upper limit | Visit scheduled date | Replacement consumable list |
|---|---|---|---|---|---|
| 100213 | 2006/9/5 | 2006/8/23 | 2006/9/15 | 2006/9/5 | PM |
| 102399 | 2006/9/13 | 2006/8/31 | 2006/9/22 | 2006/9/11 | Photoconductive drum |
| 102400 | 2006/9/27 | 2006/9/10 | 2006/10/2 | 2006/9/26 | PM |
|  |  |  |  |  | Photoconductive drum |
|  |  |  |  |  | Cleaning roller |
|  |  |  |  |  | Heat roller |
|  |  |  |  |  | Drum cleaning blade |
|  |  |  |  |  | Electrification charger grid |
|  |  |  |  |  | Drum peeling pawl |
|  |  |  |  |  | Pressing roller |
| 103560 | 2006/9/16 | 2006/9/1 | 2006/9/23 | 2006/9/15 | PM |
|  |  |  |  |  | Photoconductive drum |
|  |  |  |  |  | Heat roller |
|  |  |  |  |  | Pressing roller |

January 24, 2006 (tue)

User ID : A00012

Name : XY corporation

--Maintenance schedule calculation result--

Next visit date : February 20, 2006 (mon)

Replacement components :

Machine number : 100213 photoconductive drum, feed roller
    Machine number : 100214 photoconductive drum
    Machine number : 101501 feed roller, fixing roller 1, fixing roller 2

Optimum visit date :  February 23, 2006 (thu)
Visit date lower limit : February 10, 2006 (fri)
Visit date upper limit : March 1, 2006 (wed)

F I G. 31

MAINTENANCE SCHEDULING SYSTEM, MAINTENANCE SCHEDULING METHOD, AND IMAGE FORMING APPARATUS

CROSS-REFERENCE TO RELATED APPLICATIONS

This application is based upon and claims the benefit of U.S. Provisional Applications
No. 61/029,874, filed Feb. 19, 2008;
No. 61/029,876, filed Feb. 19, 2008; and
No. 61/036,581, filed Mar. 14, 2008.

TECHNICAL FIELD

The present invention relates to a technique for estimating failure time of a product including plural components and degrees of deterioration of the respective components and reflecting the failure time and the degrees of deterioration on a maintenance schedule.

BACKGROUND

In the related art, a maintenance schedule is laid out on the basis of the experience and the intuition of an individual serviceperson. Therefore, the risk of damages to a user caused by the unavailability of a product and the cost required for maintenance cannot be balanced.

If it is attempted to replace a component, which is highly likely to be broken, before the component reaches the end of durable life and reduce the risk of a product failure, replacement work has to be performed more than necessary and the cost of maintenance increases. Conversely, if it is attempted to use up the component until the component reaches the end of durable life to reduce the maintenance cost, the component is replaced after the component is broken. Therefore, downtime is long and damages to the user caused by unavailability of the product increase. In other words, there is a tradeoff relation between the risk of failure of the component and the maintenance cost.

In a technique disclosed in JP-A-2007-4298, a maintenance schedule is laid out on the basis of a failure probability. In this technique, the maintenance schedule is laid out on the basis of a failure probability of a product as a whole. However, it is not determined whether components should be replaced. Further, the laid-out maintenance schedule does not present how the components should be combined and replaced.

SUMMARY

According to an aspect of the present invention, there is provided a maintenance scheduling system that lays out a maintenance schedule for an image forming apparatus that forms an image and exchanges information with an external apparatus. The maintenance scheduling system includes: an actual-use-result acquiring unit that acquires actual use result information of consumables; a failure-probability-distribution estimating unit that estimates failure probability distributions of the consumables on the basis of a history of the actual use result information of the consumables; a cost-related-constant acquiring unit that acquires cost related constants of the consumables; a first cost calculating unit that sets a visit interval value representing a time interval of visit for maintenance work for the consumables to plural values and calculates, for each of the plural visit interval values, cost per unit time required for the image forming apparatus on the basis of the failure probability distributions, the history of the actual use result information, and the cost related constants of the consumables; a visit-interval calculating unit that calculates, on the basis of the cost calculated by the first cost calculating unit, the visit interval value giving minimum cost as a minimum cost visit interval value; a second cost calculating unit that sets an replacement interval value representing a time interval for replacement of the consumables to plural values and calculates, for each of the plural replacement interval values, cost per unit time required for the image forming apparatus on the basis of the failure probability distributions, the history of the actual use result information, and the cost related constants of the consumables; a replacement-interval calculating unit that calculates a calculated replacement interval value on the basis of the cost calculated by the second cost calculating unit; and a maintenance-schedule presenting unit that presents the next visit time and at least one of the consumables to be replaced in the visit on the basis of the minimum cost visit interval value and the calculated replacement interval value.

According to another aspect of the present invention, there is provided a maintenance method for laying out a maintenance schedule for an image forming apparatus that forms an image and exchanges information with an external apparatus. The maintenance method includes: acquiring actual use result information of consumables; estimating failure probability distributions of the consumables on the basis of a history of the actual use result information of the consumables; acquiring cost related constants of the consumables; setting a visit interval value representing a time interval of visit for maintenance work for the consumables to plural values and calculating, for each of the plural visit interval values, cost per unit time required for the image forming apparatus on the basis of the failure probability distributions, the history of the actual use result information, and the cost related constants of the consumables; calculating, on the basis of the cost calculated for each of the plural visit interval values, the visit interval value giving minimum cost as a minimum cost visit interval value; setting an replacement interval value representing a time interval for replacement of the consumables to plural values and calculating, for each of the plural replacement interval values, cost per unit time required for the image forming apparatus on the basis of the failure probability distributions, the history of the actual use result information, and the cost related constants of the consumables; calculating a calculated replacement interval value on the basis of the cost calculated for each of the plural replacement interval values; and presenting the next visit time and at least one of the consumables to be replaced in the visit on the basis of the minimum cost visit interval value and the calculated replacement interval value.

According to still another aspect of the present invention, there is provided an image forming apparatus that forms an image and exchanges information with an external apparatus. The image forming apparatus includes: a storing unit that stores actual use result information of consumables; and an information transmitting unit that transmits the actual use result information of the consumables to a maintenance scheduling system that lays out a maintenance schedule for the image forming apparatus. The maintenance scheduling system includes: an actual-use-result acquiring unit that acquires actual use result information of the consumables; a failure-probability-distribution estimating unit that estimates failure probability distributions of the consumables on the basis of a history of the actual use result information of the consumables; a cost-related-constant acquiring unit that acquires a cost related constants of the consumables; a first cost calculating unit that sets a visit interval value representing a time interval of visit for maintenance work for the consumables to plural values and calculates, for each of the plural visit interval values, cost per unit time required for the image forming apparatus on the basis of the failure probability distributions, the history of the actual use result information, and the cost related constants of the consumables; a visit-interval calculating unit that calculates, on the basis of the cost calculated by the first cost calculating unit, the visit interval value giving minimum cost as a minimum cost visit interval value; a second cost calculating unit that sets an replacement interval value representing a time interval for replacement of the consumables to plural values and calculates, for each of the plural replacement interval values, cost per unit time required for the image forming apparatus on the basis of the failure probability distributions, the history of the actual use result information, and the cost related constants of the consumables; a replacement-interval calculating unit that calculates a calculated replacement interval value on the basis of the cost calculated by the second cost calculating unit; and a maintenance-schedule presenting unit that presents the next visit time and at least one of the consumables to be replaced in the visit.

Additional objects and advantages of the invention will be set forth in the description which follows, and in part will be obvious from the description, or may be learned by practice of the invention. The objects and advantages of the invention may be realized and obtained by means of instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a system diagram of an overview of a maintenance scheduling system according to an embodiment of the present invention;

FIG. 3 is a diagram of a system configuration including the maintenance scheduling system;

FIGS. 4A and 4B are diagrams of a relation between formats of data and data tables used in the maintenance scheduling system;

FIG. 5 is a table of information stored in a memory of the MFP;

FIG. 6 is a diagram of an example of a "maintenance history" table;

FIG. 7 is a diagram of an example of a "consumable" table;

FIG. 8 is a diagram of an example of a "life counter history" table;

FIG. 9 is a diagram of an example of a "machine" table;

FIG. 10 is a diagram of an example of data of a "consumable state" table;

FIG. 16 is a diagram of an output result in the "visit date presenting mode";

FIG. 18 is a diagram of an example of a "visit schedule" table;

FIG. 26 is a diagram of a "visit date" input screen;

FIG. 27 is a diagram of an output result in the "visit date presenting mode";

FIG. 30 is a diagram of an example of a "visit schedule" table; and

FIG. 31 is a diagram of an output result in the "visit date presenting mode".

DETAILED DESCRIPTION

Embodiments of the present invention are explained below with reference to an image processing apparatus (MFP: Multi Function Peripheral) 201 as an example.

The MFP 201 means a digital complex machine not only for scanning and copying an image at designated resolution and sheet size but also for comprehensively utilizing functions of various office machines such as an image receiving function by a facsimile, an image receiving function by an E-mail, and a print image receiving function by a network.

Figure 1:
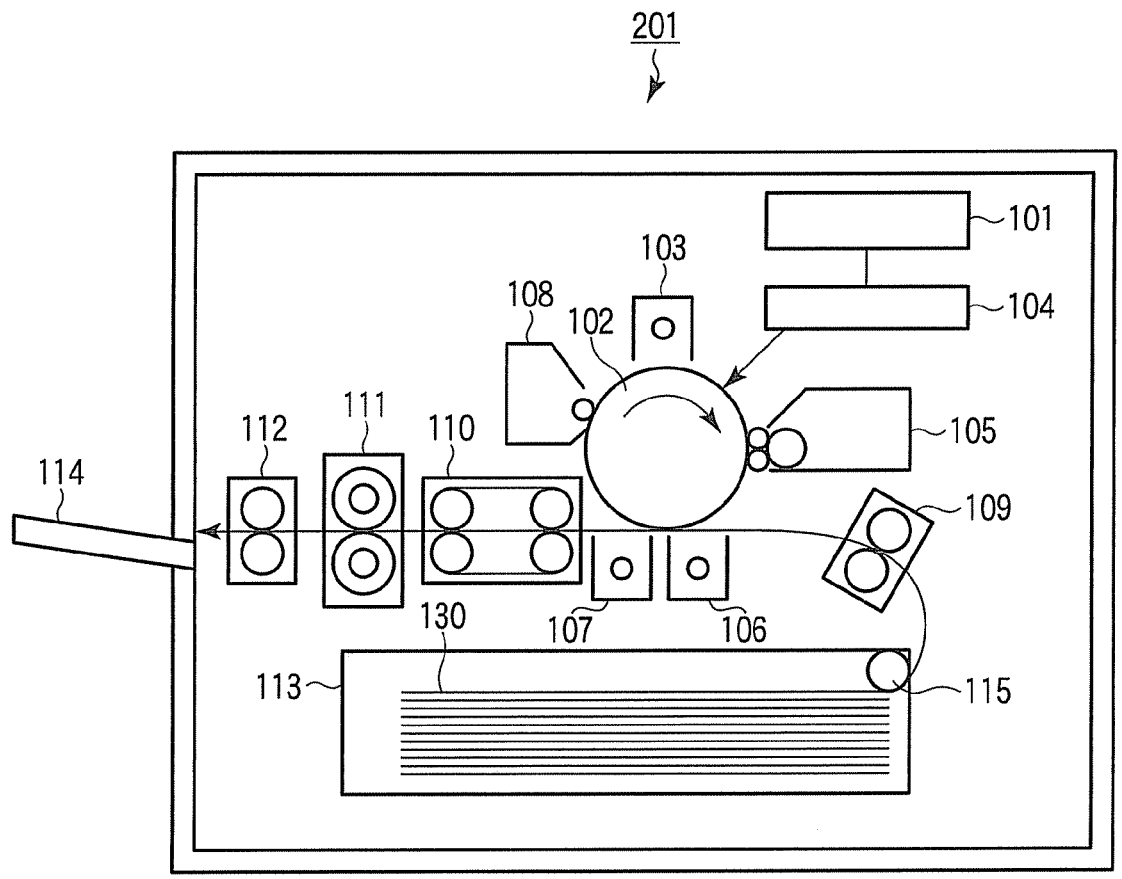
FIG. 1 is a block diagram of a configuration of a copy function of an MFP.

FIG. 1 is a block diagram of a configuration of a copy function of the MFP 201.

The MFP 201 includes a control unit 101, a photoconductive drum 102, a charger 103, a scanning and exposing unit 104, a developing device 105, a transfer charger 106, a peeling charger 107, a cleaner 108, a paper feeding unit 109, a sheet conveying unit 110, a fixing device 111, a paper discharging unit 112, and a paper discharge tray 114.

The photoconductive drum 102 rotates in a sub-scanning direction (a circumferential direction of the photoconductive drum 102). The charger 103 is arranged around the photoconductive drum 102. The charger 103 uniformly charges the surface of the photoconductive drum 102. The scanning and exposing unit 104 turns on and off a semiconductor laser in the scanning and exposing unit 104 according to an image signal while performing scanning with the semiconductor laser. A laser beam emitted from the semiconductor laser is changed to light for scanning in a main scanning direction (a rotating shaft direction of the photoconductive drum 102) by a deflector such as a polygon mirror. The laser beam is irradiated on the photoconductive drum 102 by an optical system such as a lens. When the laser beam is irradiated on the charged photoconductive drum 102, the potential in an irradiated section falls and an electrostatic latent image is formed.

The developing device 105 applies a developer to the photoconductive drum 102 to form a toner image on the photoconductive drum 102. On the other hand, a sheet tray 113 is provided at the bottom of the MFP 201. The paper feeding roller 115 separates sheets 130 in the sheet tray 113 one by one and delivers the sheet 130 to the paper feeding unit 109. The paper feeding unit 109 feeds the sheet 130 to a transfer position of the photoconductive drum 102. The transfer charger 106 transfers the toner image onto the fed sheet 130. The peeling charger 107 peels off the sheet 130 from the photoconductive drum 102.

The sheet 130 having the toner image transferred thereon is conveyed by the sheet conveying unit 110. The fixing device 111 fixes the toner image on the sheet 130. The paper discharging unit 112 discharges the sheet 130 having an image printed thereon to the paper discharge tray 114.

After the transfer of the toner image onto sheet 130 is finished, a residual toner on the photoconductive drum 102 is removed by the cleaner 108. The photoconductive drum 102 returns to an initial state and is put on standby for the next image formation.

By repeating the process operations explained above, an image forming operation is continuously performed.

FIG. 2 is a system diagram of an overview of a maintenance scheduling system according to an embodiment of the present invention. In an example shown in FIG. 2, a maintenance schedule for the MFP 201 set in an office of a user is laid out by the maintenance scheduling system according to this embodiment and a serviceperson 202 performs maintenance work according to the maintenance schedule.

As maintenance methods in the related art, there are preventive maintenance (PM) and emergency maintenance (EM). In the PM, the serviceperson 202 visits the user of the MFP 201 as a maintenance target at periodical timing set for each of MFPs and performs consumable replacement, cleaning, and operation check for the MFP 201. In the EM, when a failure accidentally occurs, the serviceperson 202 receives a service call from the user and visits the user to repair the MFP 201.

Concerning the PM work, since plural consumables are present in one MFP 201, all the consumables are not always deteriorated when the PM is performed. If consumables that do not reach the end of the durable life are replaced, a loss of consumables occurs. If only a part of broken consumables is replaced when a failure accidentally occurs, replacement time for the replaced consumables shifts from a cycle of the PM.

Under such a situation, when the serviceperson 202 visits the user for the PM or the EM, it is difficult to determine which components should be replaced and which components should be continuously used.

Although the serviceperson 202 acts on the basis of a set PM cycle, the serviceperson 202 separately performs adjustment of replacement time for each of the consumables on the basis of the experience to reduce losses. However, if a reduction in cost is realized by unreasonably delaying the replacement time and extending service life, contrary to the intention, the risk of failure of the consumables increases and the user suffers damages due to unavailability of the MFP. If the replacement time is changed for each of the consumables, it is likely that the number of times of visit increases and maintenance cost increase.

Therefore, a maintenance scheduling system 1 according to this embodiment lays out a more meticulous maintenance schedule for consumables rather than replacing the consumables at only a PM cycle. The maintenance scheduling system 1 sets two indexes, i.e., a "visit interval" indicating "when a serviceperson visits a customer" and a "replacement interval" indicating "which components the serviceperson should replace" when the serviceperson visits the customer. The serviceperson visits the customer for the PM according to the "visit interval" and, when the serviceperson visits the customer for the PM or the EM, determines, according to the "replacement interval", whether components other than components as targets of the PM or the EM should be replaced. In this way, the maintenance scheduling system 1 optimizes the cost of maintenance and the risk of failure.

A maintenance method shown in FIG. 2 is explained. A plurality of the servicepersons 202 perform maintenance of a plurality of the MFPs 201 set in offices of plural users from one service center 203 as a base.

When work is finished, the serviceperson 202 transmits maintenance history data to the maintenance scheduling system 1 via a communicating unit 207 of the MFP 201. If the MFP 201 does not have a communication function like an MFP in the past, the serviceperson 202 inputs maintenance history data to the maintenance scheduling system 1 from a work record arranged as a report of maintenance work after the serviceperson 202 returns to the service center 203. The maintenance history data is stored in a storing unit 205.

When set periodic communication time (e.g., 10 o'clock everyday) comes, the MFP 201 transmits data concerning a state of use to the maintenance scheduling system 1. The data concerning the state of use is stored in the storing unit 205.

In the maintenance scheduling system 1, a failure-history analyzing unit 204 calculates a failure ratio distribution for each of consumables on the basis of maintenance history data in the past and performs failure prediction on the basis of the failure ratio distribution. A maintenance scheduling unit 206 calculates the next visit time and a list of consumables to be replaced in the visit from data concerning a state of use of the MFP 201 collected via the communicating unit 207.

FIG. 3 is a diagram of a system configuration including the maintenance scheduling system 1.

In the service center 203, a router 11 and a firewall 12 are provided to eliminate illegal accesses from the outside. The maintenance scheduling system 1 is connected to a demilitarized zone behind the firewall 12 to permit only specific accesses.

In the maintenance scheduling system 1, a CPU 20, a memory 21, a communicating unit 22, a storage device 23, an input device 24, and an output device 25 are provided.

The CPU 20 collectively controls operations of the maintenance scheduling system 1. Programs running on the maintenance scheduling system 1 are stored in the storage device 23. For example, the failure-history analyzing unit 204 and the maintenance scheduling unit 206 are stored in the storage device 23. The communicating unit 22 is an interface for exchanging information between the maintenance scheduling system 1 and the MFP 201 via the Internet 10. In the storage device 23, the storing unit 205 having stored therein data concerning a maintenance history and data concerning a state of use is provided. The input device 24 is inputting means such as a keyboard and a mouse for inputting an instruction or data to the maintenance scheduling system 1. The output device 25 is a display device for presenting information.

Functions of the respective means configuring the maintenance scheduling system 1 are explained below with reference to FIG. 2. In the maintenance scheduling unit 206, functions such as visit-interval calculating means, replacement-interval calculating means, combination-calculating means, interval-information acquiring means, and maintenance-schedule calculating means are further provided.

The failure-history analyzing unit 204 calculates a failure ratio distribution concerning each of consumables on the basis of maintenance history data, which is history information concerning maintenance work applied to the MFP 201. As explained above, the history information concerning the maintenance work applied to the MFP 201 is stored in the storing unit 205 through communication from the MFP 201 or input by the serviceperson 202 who performs the maintenance work.

The maintenance scheduling unit (visit-interval calculating mans) 206 calculates, on the basis of the failure ratio distribution of each of the consumables and predetermined cost and risk, for each of the consumables, a "visit interval" specifying a time interval at which the serviceperson 202 should visit the user to perform the maintenance work. The maintenance scheduling unit (replacement-interval calculating means) 206 calculates, on the basis of the failure ratio distribution of each of the consumables and the predetermined cost and risk, for each of the consumables, a "replacement interval" specifying a time interval at which the serviceperson 202 should replace the consumable.

Examples of the "consumables" include the photoconductive drum 102, an electrification charger wire, a fixing roller, and a transfer belt. However, in this embodiment, the "consumables" also include a cartridge in which plural consumable components having functions different from one another are integrated as a unit.

The "predetermined cost and risk" is a total of personnel expenses for maintenance work by a serviceperson, material expenses for the consumables, and a loss that a user suffers because of unavailability of an apparatus as a maintenance target.

On the other hand, the communicating unit 207 of the MFP 201 acquires a present life counter value of each of the consumables and transmits the life counter value and the like to the maintenance scheduling system 1. The life counter value means a counter value corresponding to a physical amount effective for grasping a degree of deterioration of each of consumables mounted on the MFP 201 such as a cumulative number of revolutions of the photoconductive drum 102 or cumulative driving time of the charger 103. In the past, for all components, the number of processed sheets (e.g., the number of scanned originals or the number of printed sheets) of the MFP 201 is used as a total counter value. As functions of MFPs are becoming complicated, deterioration is substantially different among components because, for example, the photoconductive drum 102 for color does not operate during monochrome printing in a color machine, a plurality of the sheet trays 113 are provided according to sheet sizes, and a frequency of use is substantially different depending on a sheet tray. Therefore, there is an increasing necessity for management by a life counter corresponding to each of the consumables.

Transmitted life counter values are stored in the storing unit 205.

The maintenance scheduling unit (maintenance schedule calculating means) 206 calculates, on the basis of information concerning the visit time calculated by the maintenance scheduling unit (the visit-interval calculating means) 206, information concerning the replacement time calculated by the maintenance scheduling unit (the replacement-interval calculating means) 206, and the life counter value of each of the consumables acquired via the communicating unit 207, timing when the serviceperson 202 should visit next time and a list of consumables that should be replaced at that timing.

Figure 4B:
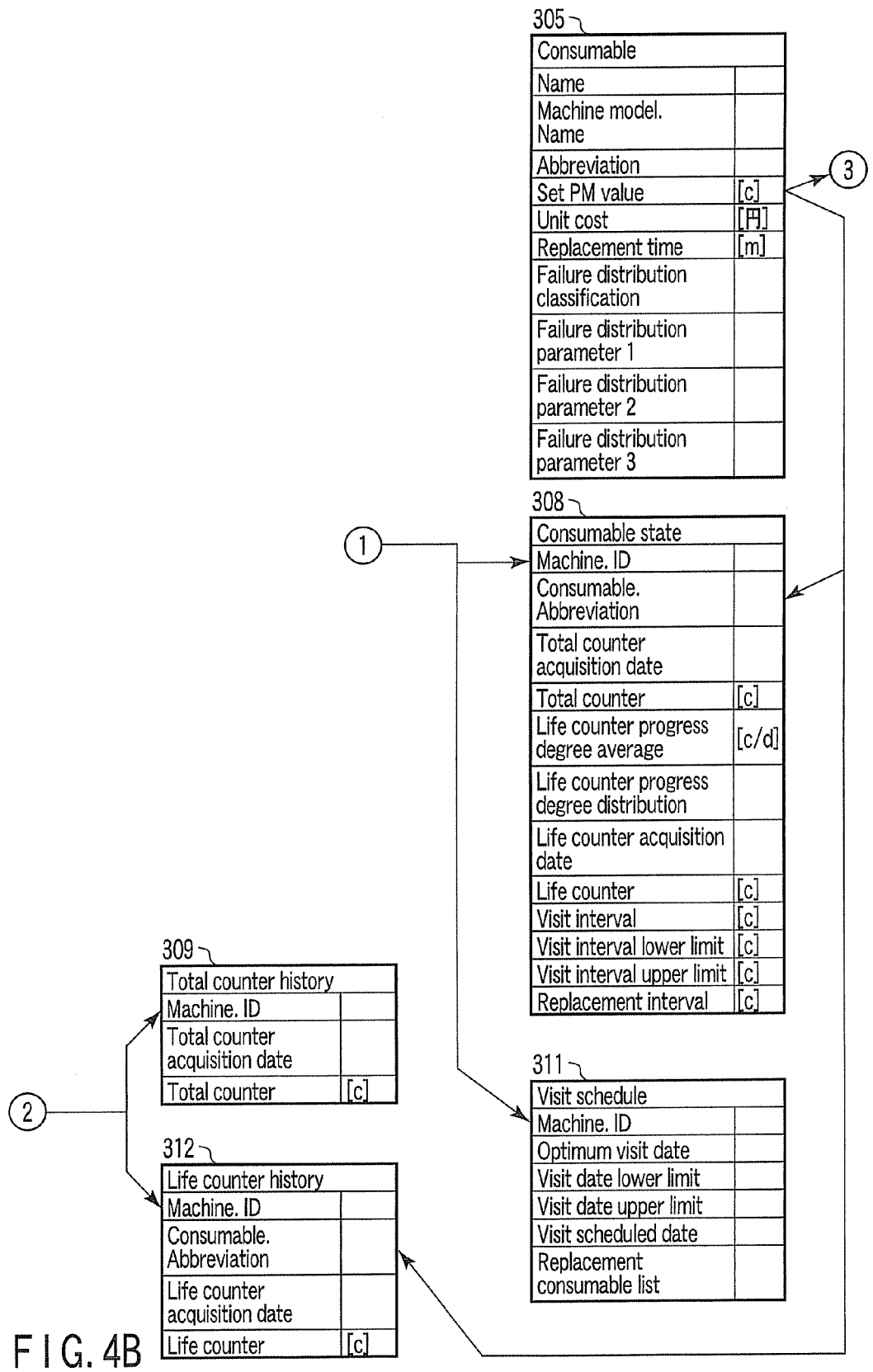

FIGS. 4A and 4B are diagrams of a relation between formats of data and data tables used in the maintenance scheduling system 1 according to this embodiment.

The data tables used in the system include a "user" table 301, a "support center" table 302, a "machine model" table 303, a "machine" table 304, a "consumable" table 305, a "user and machine correspondence" table 306, a "maintenance history" table 307, a "consumable state" table 308, a "total counter history" table 309, a "serviceperson" table 310, a "visit schedule" table 311, and a "life counter history" table 312.

In the "user" table 301, constants for each of users are set. In the "support center" table 302, constants for the support center 203 are set. In the "machine model" table 303, constants for a machine model are set. In the "machine" table 304, constants for each of machines and variables calculated from a state of use of the machine are set. In the "consumable" table 305, constants for a consumable and variables for a failure ratio calculated from market data are set. In the "user and machine correspondence" table 306, correspondence between a machine owned by a user and the user is shown. In the "maintenance history" table 307, a maintenance work history of a serviceperson is recorded. In the "consumable state" table 308, a state of each of consumables is set. In the "total counter history" table 309, a total counter history of each of the machines is recorded. In the "serviceperson" table 310, constants for the serviceperson are set. In the "visit schedule" table 311, a visit scheduled date for each of the machines and a replacement consumable list are set. In the "life counter history" table 312, a life counter history for each of consumables of each of the machines is recorded.

An arrow in the figures indicates that an attribute at the source of the arrow is set in an attribute at the destination of the arrow. A word before "." of the attribute at the destination of the arrow indicates a table name at a reference source. A word after "." indicates an attribute name of the reference source. For example, "machine. ID" of the "maintenance history" table 307 represents an "ID" of the "machine" table 304.

When the serviceperson 202 performs maintenance work, the serviceperson 202 updates data set in a memory of the MFP 201.

FIG. 5 is a table of information stored in the memory of the MFP 201. Concerning a consumable as a replacement target, the serviceperson 202 sets a total counter value presently in use set in the memory of the MFP 201 in a "last replacement total count", sets a life counter value presently in use in a "last replacement life counter", and resets a total counter value in use and a life counter value in use to 0. If the consumable is replaced because the consumable is broken, the serviceperson 202 sets "B" in "reach life" set in the memory of the MFP 201. If the consumable is replaced because, although not broken, the consumable reaches the end of a set life, the serviceperson sets "A" in "reach life".

The MFP 201 has the communicating unit 207 and is connected to the maintenance scheduling system 1 through the Internet or a public telephone line. The serviceperson 202 executes processing for data transmission to the maintenance scheduling system 1 when the work is finished. The service center 203 receives the data and updates the "maintenance history" table 307 stored in the storing unit 205. FIG. 6 is a diagram of an example of the "maintenance history" table 307, contents of which are updated as explained above.

When the periodic communication time (e.g., 10 o'clock everyday) comes, the MFP 201 performs communication with the maintenance scheduling system 1. During the communication, the MFP 201 transmits an ID number of the MFP 201, present date and time, a present total counter value, a present total counter value and life counter value of each of the consumables, and the like to the maintenance scheduling system 1. The maintenance scheduling system 1 reflects the information received from the MFP 201 on the "total counter history" table 309 and the "life counter history" table 312 stored in the storing unit 205. Thereafter, the MFP 201 checks a status of the communication and additional information and finishes the communication with the maintenance scheduling system 1.

The failure-history analyzing unit 204 estimates a failure ratio distribution of each of the consumables on the basis of the "maintenance history" table 307. In a failure distribution analysis, the failure-history analyzing unit 204 performs fitting to a Weibull distribution (m: shape parameter and η: scale parameter) indicated by Formula (1).

$$F(t)=1-e\{-(t/\eta)^m\} \quad (1)$$

A failure distribution analyzing method for the photoconductive drum 102, which is a consumable of a machine model A, is explained with reference to FIG. 6.

In order to calculate a failure ratio distribution of the photoconductive drum 102, the failure-history analyzing unit 204 refers to the "last replacement life counter" and the "reach life" in the "maintenance history" table 307 read from the storing unit 205.

Items marked "B" in the "reach life" at the right end of the "maintenance history" table 307 are data obtained when the photoconductive drum 102 is broken before the PM. Items marked "A" are data obtained when the photoconductive drum 102 is not broken but is replaced after the PM. Data including the data (the items marked A) obtained when the photoconductive drum 102 is replaced before a failure occurs is referred to as "truncated data". As a method of analyzing data including the "truncated data", a cumulative hazard method is known. The failure-history analyzing unit 204 estimates, using the cumulative hazard method, the shape parameter "m" and the scale parameter "η" of the Weibull distribution on the basis of a failure interval (the last replacement life counter) of each of tuples. The failure-history analyzing unit 204 updates a failure distribution related variable of the "consumable" table 305. FIG. 7 is a diagram of an example of the "consumable" table 305.

The failure-history analyzing unit 204 extracts tuples, "machine model. name" and "abbreviation" of which in the "consumable" table 305 match the "machine model A" and the "photoconductive drum", and substitutes the shape parameter "m" in a "failure distribution parameter 1" and substitutes the scale parameter "η" in a "failure distribution parameter 2". The failure-history analyzing unit 204 sets a constant (=0) corresponding to the Weibull distribution in a "failure distribution classification". The failure-history analyzing unit 204 performs this calculation for each of the consumables to update the "consumable" table 305 of the storing unit 205. In the figure, "K" in the "failure distribution parameter 2" represents a unit "1000". This estimation of a failure ratio distribution is executed when a fixed amount of maintenance history data is additionally inputted or at periodic timing such as once a month.

FIG. 8 is a diagram of an example of the "life counter history" table 312. FIG. 9 is a diagram of an example of the "machine" table 304.

The failure-history analyzing unit 204 calculates a progress degree distribution of the life counter per day for each of the consumables on the basis of the "life counter history" table 312. The failure-history analyzing unit 204 extracts tuples having the same "machine. ID" and the same "consumable. abbreviation" from the "life counter history" table 312. The failure-history analyzing unit 204 calculates an average and a distribution of counter change amounts (progress degrees) per day on the basis of a difference (the number of days) in a "life counter acquisition date" and an amount of change in a "life counter". The failure-history analyzing unit 204 substitutes the average of the counter progress degrees in a "life counter progress degree average" of the "consumable state" table 308 and substitutes the calculated distribution of the counter progress degrees in a "life counter progress degree distribution" of the "consumable state" table 308.

The failure-history analyzing unit 204 extracts tuples having the same "machine. ID" and the same "consumable. abbreviation" from the "life counter history" table 312. The failure-history analyzing unit 204 specifies a tuple having a latest "life counter acquisition date" from the extracted all tuples. The failure-history analyzing unit 204 substitutes the "life counter acquisition date" of the specified tuple in a "life counter acquisition date" of the "consumable state" table 308 and substitutes a "life counter" value of the specified tuple in a "life counter" of the "consumable state" table 308. FIG. 10 is a diagram of an example of data of the "consumable state" table 308. These kinds of processing are executed everyday.

Operations of the maintenance scheduling unit 206 are explained below.

The maintenance scheduling unit 206 has a "strategy deciding mode" and a "visit date presenting mode". The "strategy deciding mode" is a mode for laying out an optimum maintenance schedule when a fixed amount of maintenance history data is additionally registered in the storing unit 205 or at periodic timing such as once a month. The "visit date presenting mode" is a mode in which the serviceperson 202 checks contents of the laid-out maintenance schedule. The serviceperson 202 uses this mode almost everyday.

First, the "strategy deciding mode" is explained.

The maintenance scheduling unit 206 sets, for each of machines, a "visit interval" and a "replacement interval" for each of the consumables. The serviceperson 202 performs maintenance work on the basis of the "visit interval" and the "replacement interval".

If at least one of the consumables of the MFP 201, which is a maintenance target machine, reaches the "visit interval", the serviceperson 202 visits the user of the apparatus. The serviceperson 202 replaces all consumables that reach the "replacement interval" when the serviceperson 202 visits the user.

A method of calculating the "visit interval" and the "replacement interval" is explained in detail below.

The maintenance scheduling unit 206 calculates, on the basis of the failure ratio distribution and the predetermined cost and risk of each of the consumables, for each of the consumables, the "visit interval" specifying a time interval at which the serviceperson 202 should visit the user to perform maintenance work and the "replacement interval" specifying a time interval at which the serviceperson 202 should replace the consumable.

The predetermined cost and risk means personnel expenses for maintenance work by a serviceperson, material expenses for replaced consumables, and a loss that a user suffers because of unavailability of a machine due to an unexpected machine failure, i.e., a downtime loss. The expenses and the downtime loss are calculated by the following formulas:

Personnel expenses=("user. moving time"+Σ "consumable. replacement time" of replaced consumables)×"support center. serviceperson unit cost"

Material expenses=Σ "consumable. unit cost" of replaced consumables

Downtime loss="user. moving time"דmachine. downtime loss unit cost"

"user. moving time" indicates moving time from the support center 203 to a user location.

Figure 11:
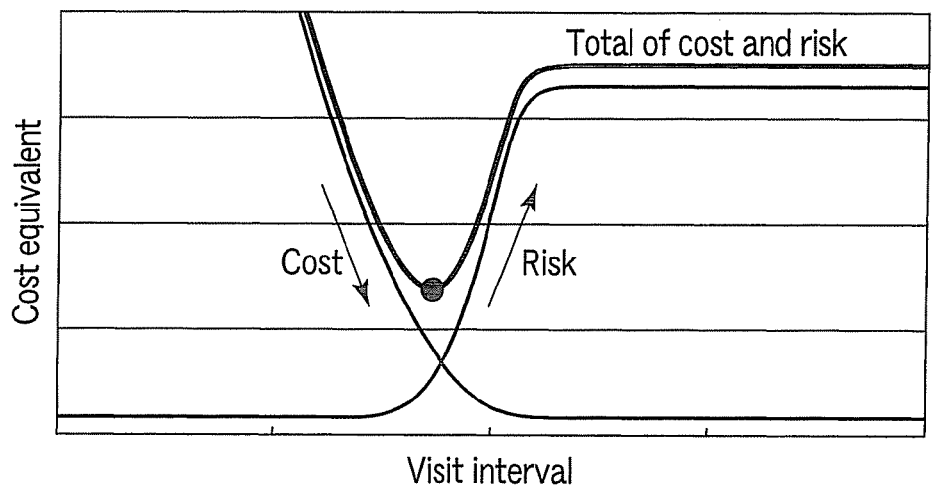
FIG. 11 is a graph for explaining a method of calculating a "visit interval"

FIG. 11 is a diagram for explaining a method of calculating a desirable "interval period". The abscissa of the figure represents a "visit interval" and the ordinate indicates a loss (cost and risk) per unit time caused when the "visit interval" is adopted. In FIG. 11, three curves for cost and risk per unit time and a total value of the cost and the risk are shown.

As shown in FIG. 11, when the "visit interval" is set large, since the number of times of visit in a predetermined period decreases, cost (personnel expenses and material expenses) per unit time decreases. Therefore, the curve of the cost indicates a characteristic that the cost decreases as the "visit interval" increases. However, when the "visit interval" is set large, since a failure ratio in the predetermined period rises, the risk (the downtime loss) increases. Therefore, the curve of the risk indicates a characteristic that the risk increases as the "visit interval" increases and, when the "visit interval" is equal to or larger than a certain value, a predetermined downtime loss always occurs. Therefore, in the curve of the total of the cost and the risk (a cost risk curve), a "visit interval" at which the loss is minimized is present. Therefore, by creating the curve of the cost and the curve of the risk on the basis of predetermined data, it is possible to calculate a desirable "visit interval" at which the loss is minimized.

The predetermined data is, for example, failure probability distributions of consumables, a history of actual use result information (including counter values of physical amounts related to degrees of deterioration of the consumables at the time of replacement of the consumables, acquisition dates of the counter values, and life information indicating whether the consumables are replaced because the consumables reaches the end of the durable life), and cost related constants (unit costs and replacement times of the consumables, work expenses per unit time and moving time of the serviceperson, and a loss of the user per unit time due to unavailability of the image forming apparatus).

Figure 12:
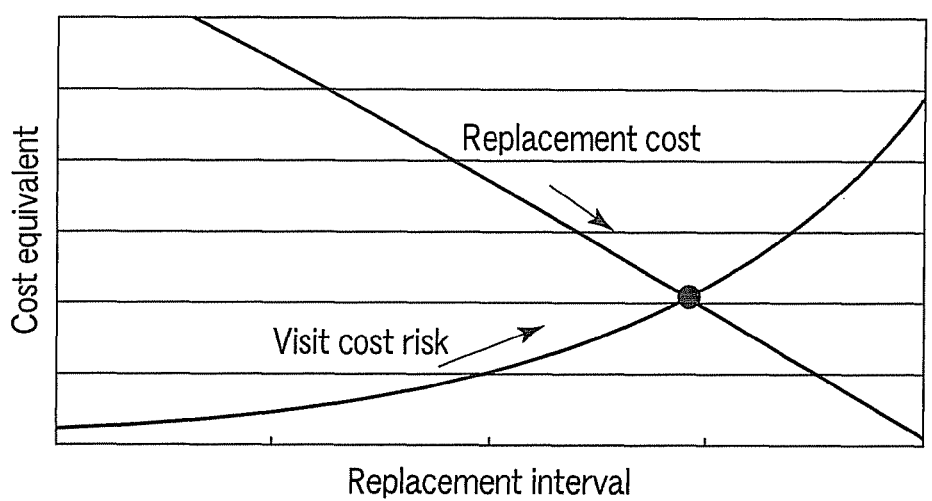
FIG. 12 is a graph for explaining a method of calculating a "replacement interval"

The "replacement interval" is an index for determining, when the serviceperson 202 visits the user in order to replace other consumables (the PM complying with the "visit interval" or the EM due to an unexpected failure), on the basis of the predetermined cost and risk, whether target consumables should be replaced together. FIG. 12 is a graph for explaining a method of calculating the "replacement interval". The abscissa in the figure represents the "replacement interval" and the ordinate represents cost per unit time incurred when the "replacement interval" is adopted. In FIG. 12, two curves, i.e., revisit cost per unit time and PM generated cost, are shown.

The revisit cost is an expected value of a loss caused, if a target consumable is replaced at the present point, because visit due to convenience of the other consumables is performed again until the PM (visit interval) of the target consumable. In other words, the revisit loss is an expected value of a loss caused because the target consumable is replaced despite the fact that the target consumable can be still used if not replaced at the present point. As shown in FIG. 12, when the "replacement interval" increases, since a probability of replacement of the other consumables falls and a period in which the consumables are replaced in advance decreases, revisit cost (personnel expenses and material expenses) per unit time decreases until the "visit interval". Therefore, a curve of the revisit cost indicates a characteristic that the revisit cost decreases as the "replacement interval" increases.

On the other hand, the PM generated cost is an expected value of a loss caused, if a target consumable is not replaced at the present point, because visit due to convenience of the other consumables is not performed until the "visit interval" of the target consumable and, eventually, new visit due to the PM is performed. When the "replacement interval" increases, since a probability of replacement of the other consumables falls, the PM generated cost (personnel expenses and material expenses) per unit time increases until the "visit interval". Therefore, a curve of the PM generated cost indicates a characteristic that the PM generated cost increases as the "replacement interval" increases.

Therefore, as shown in FIG. 12, a break-even point where the revisit cost, which is incurred when the target consumable is replaced together with the other consumables at the time of visit due to convenience of the other consumables, and the PM generated cost, which is incurred when the target consumable is not replaced together with the other consumables, invert is a desirable "replacement interval". It is possible to reduce predetermined cost if the serviceperson 202 replaces consumables that reach the desirable "replacement interval" when the serviceperson 202 visits the user.

A curve of the replacement cost and a curve of the visit cost risk are calculated, as in the case of the "visit interval", by using failure probability distributions of consumables, a history of actual use result information (including counter values of physical amounts related to degrees of deterioration of the consumables at the time of replacement of the consumables, acquisition dates of the counter values, and life information indicating whether the consumables are replaced because the consumables reach the end of the durable life), cost related constants (unit costs and replacement times of the consumables, work expenses per unit time and moving time of the serviceperson), and the like.

Figures 13, 14:
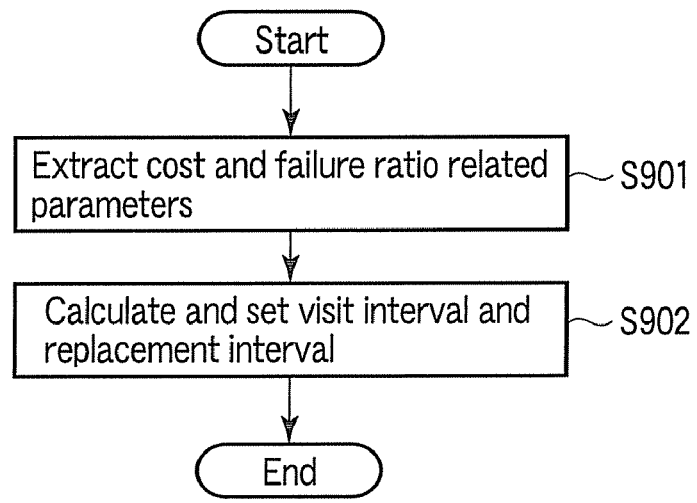
FIG. 13 is a flowchart of a schematic procedure of the calculation of the "visit interval" and the "replacement interval"
FIG. 14 is a diagram of an example of information stored in the memory of the MFP.

FIG. 13 is a flowchart of a schematic procedure of the calculation of the "visit interval" and the "replacement interval".

The maintenance scheduling unit 206 retrieves an ID of a target machine from "machine. ID" of the "machine" table 304 and extracts "machine model. name" of the "machine" table 304. The maintenance scheduling unit 206 extracts all "consumable" tables 305 having the extracted "machine model. name". Similarly, the maintenance scheduling unit 206 extracts "user. ID" from the "user and machine correspondence" table.

In Act 901, the maintenance scheduling unit 206 extracts, for each of consumables, the "unit cost", the "replacement time", and a failure probability represented by the "failure distribution classification", the "failure distribution parameter 1", and the "failure distribution parameter 2" of the "consumable" table 305 and the "life counter progress degree average" and the "life counter progress degree distribution" of the "consumable state" table 308. The maintenance scheduling unit 206 extracts the "moving time" from the "user" table 301 and extracts the "serviceperson unit cost" from the "support center" table 302.

In Act 902, the maintenance scheduling unit 206 calculates the curve of cost and the curve of risk shown in FIG. 11 from the extracted respective parameters. Then, the maintenance scheduling unit 206 calculates a cost risk curve obtained by adding up the cost and the risk from the two curves and calculates a "visit interval" at which a loss is minimized. For example, the maintenance scheduling unit 206 may apply a curve fitting method using a discrete value representing the cost risk curve or may calculate the "visit interval" by performing a numerical operation using the discrete value.

Subsequently, the maintenance scheduling unit 206 calculates the curve of revisit cost and the curve of the PM generated cost shown in FIG. 12 from the extracted respective parameters and calculates an intersection of the two curves to calculate a "replacement interval". For example, the maintenance scheduling unit 206 may apply the curve fitting method using a discrete value representing the curve of revisit cost and the curve of PM generated cost or may calculate the "replacement interval" by performing an interpolation operation using the discrete value.

The "replacement interval" can also be calculated as a minimum point of a sum of the replacement cost and the visit cost risk. Therefore, in the same manner as the procedure for calculating the "visit interval", the maintenance scheduling unit 206 may apply the curve fitting method using a discrete value representing a sum of the replacement cost and the visit cost risk or may calculate the "replacement interval" by performing a numerical operation using the discrete value.

The maintenance scheduling unit 206 sets, for each of the consumables, the calculated "visit interval" and "replacement interval" in the "visit interval" and the "replacement interval" of the "consumable state" table 308.

The MFP 201 downloads, during periodic communication, the "visit interval" and the "replacement interval" of the "consumable state" table 308 as additional information and sets the "visit interval" and the "replacement interval" in the memory of the MFP 201. Therefore, the MFP 201 can present the "visit interval" and the "replacement interval", which are optimum strategies, to the user on a display panel of the MFP 201. FIG. 14 is a diagram of an example of information stored in the memory of the MFP 201.

The "visit date presenting mode" is explained. In the "visit date presenting mode", it is assumed that the serviceperson 202 checks the next visit date, i.e., timing for visiting a user of an apparatus everyday.

The desirable "visit interval" and the desirable "replacement interval" are set in advance by the "strategy deciding mode". The serviceperson 202 checks the next visit date by inputting "machine. ID" of a machine handled by the serviceperson 202 from the input device 24 provided in the service center 203 or inputting "machine. ID" from a terminal 26 in a LAN.

Figure 15:
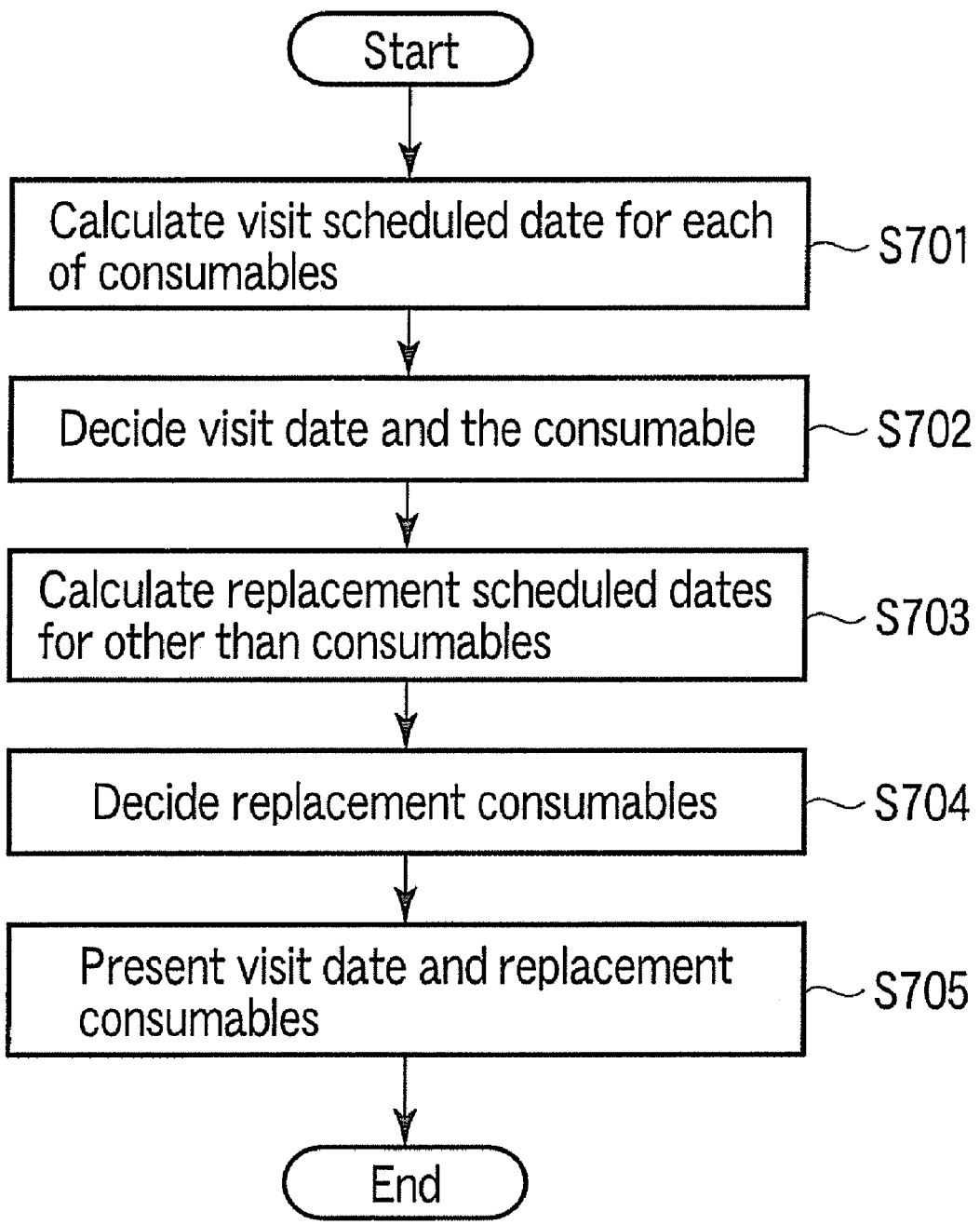
FIG. 15 is a flowchart of a schematic processing procedure of a "visit date presenting mode"

FIG. 15 is a flowchart of a schematic processing procedure of the visit date presenting mode.

The maintenance scheduling unit 206 collates the "ID" of the "machine" table 304 with the "machine. ID" of the "consumable state" table 308. The maintenance scheduling unit 206 extracts all "consumable state" tables 308 having the "machine. ID" matching the "ID" and refers to the "life counter acquisition date", the "life counter", the "life counter progress degree average", the "visit interval", and the "replacement interval".

In Act 701, the maintenance scheduling unit 206 calculates, for each of consumables, the next visit scheduled date. The next visit scheduled date is represented by Formula (2).

$$\text{Visit scheduled date} = \text{life counter acquisition date} + (\text{visit interval} - \text{life counter})/\text{life counter progress degree average} \quad (2)$$

In Act 702, the maintenance scheduling unit 206 decides, as a visit date, a nearest visit scheduled date among visit scheduled dates for the consumables. In Act 703, the maintenance scheduling unit 206 calculates replacement scheduled dates for the consumables other than the consumable to which the nearest visit planned date is given. The replacement scheduled date is represented by Formula (3).

$$\text{Replacement scheduled date} = \text{life counter acquisition date} + (\text{replacement interval} - \text{life counter})/\text{life counter progress degree average} \quad (3)$$

In Act 704, the maintenance scheduling unit 206 decides the consumables, the replacement scheduled dates for which are closer than a visit date, as replacement consumables. The maintenance scheduling unit 206 stores these calculation results in the "visit schedule" table 311. The maintenance scheduling unit 206 stores the inputted "machine. ID" in the "machine. ID" of the "visit schedule" table 311, stores the calculated visit scheduled date in the "optimum visit date", and stores the replacement consumables in the "replacement consumable list". FIG. 18 is a diagram of an example of the "visit schedule" table 311 after update. In Act 705, the maintenance scheduling unit 206 presents, in the output device 25 or the terminal 26 in the LAN, the consumable to be replaced together with the visit date. An example of an output result in the visit date presenting mode is shown in FIG. 16.

Besides the processing explained above, it is also possible to represent the "life counter progress degree average" in Formulas (2) and (3) as a section using the "life counter progress degree distribution" of the "consumable state" table 308 and estimate the visit date as a period. The maintenance scheduling unit 206 sets a lower limit and an upper limit of the calculated period in the "visit date lower limit" and the "visit date upper limit" of the "visit schedule" table 311.

Second Embodiment

A second embodiment of the present invention is explained below.

This embodiment is a modification of the first embodiment explained above and a basic system configuration of this embodiment is the same as that of the first embodiment. Components same as those already explained in the first embodiment are denoted by the same reference numerals and signs and explanation of the components is omitted.

In this embodiment, the MFP 201 as a maintenance target apparatus includes a cartridge in which the photoconductive drum 102, the charger 103, the cleaner 108, the developing device 105, and the like are integrated as a unit. The cartridge is detachable from a main body of the MFP 201.

In the cartridge in which the various components are integrated, when one of the components of the cartridge is broken, it is necessary to replace the cartridge.

Therefore, in the "strategy deciding mode", the "visit interval" and the "replacement interval" set in the "consumable state" table 308 are set as the same values for all the components of the cartridge and then set such that calculated cost is as small as possible.

Since the cartridge is easily attached and detached, even a user can replace the cartridge. It is preferable that the replacement of such a consumable that can be easily replaced is performs on the user side as long as possible from the viewpoint of maintenance job cost and efficiency.

Figure 17:
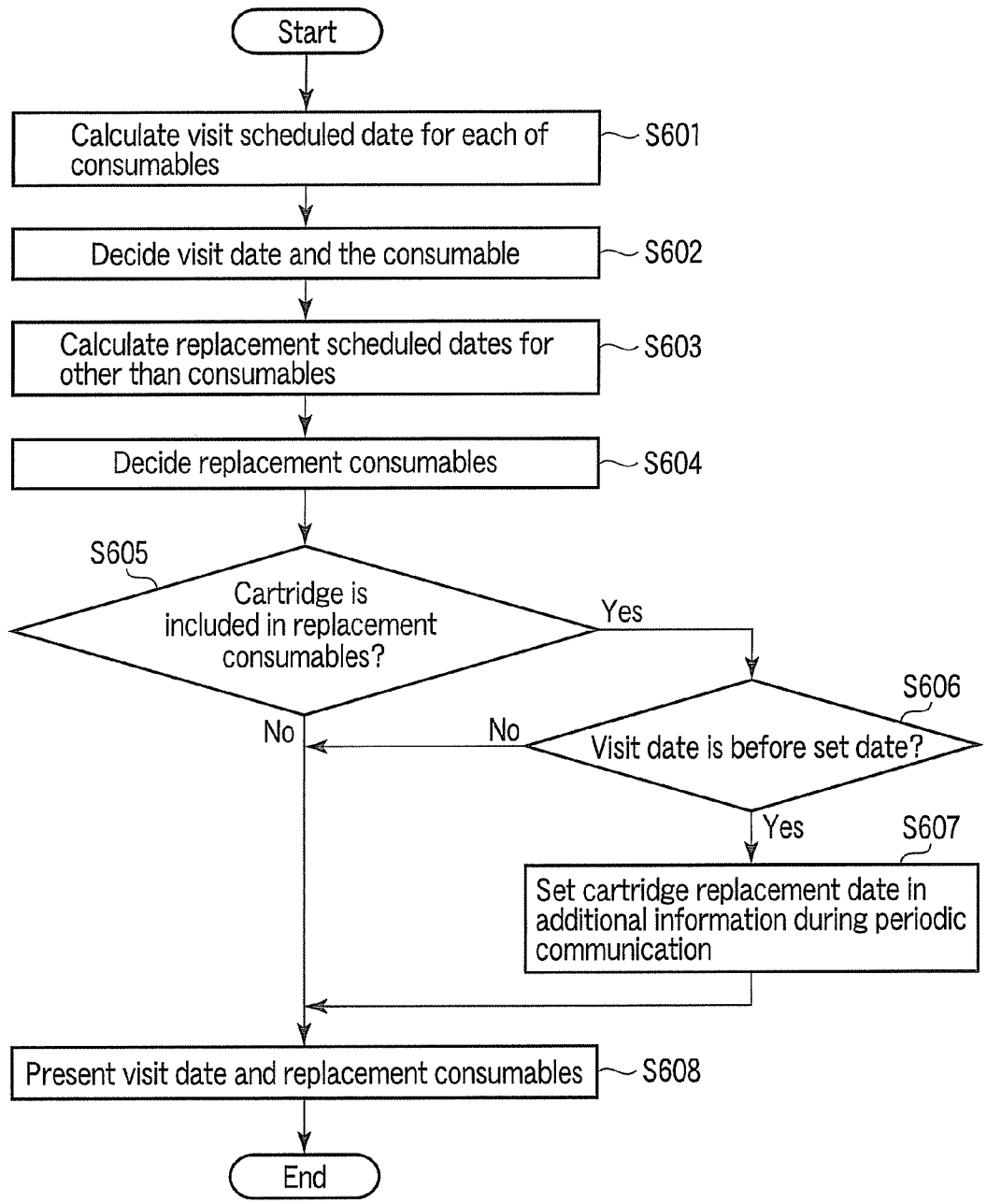
FIG. 17 is a flowchart of a schematic processing procedure of a "visit date presenting mode"

FIG. 17 is a flowchart of a schematic processing procedure of a "visit date presenting mode" in this embodiment. Processing in Acts 601 to 604 in the flowchart shown in the figure is the same as the processing in Acts 701 to 704 shown in FIG.

15 in the first embodiment. Therefore, processing in Act 605 and subsequent acts is explained.

In Act 604, the maintenance scheduling unit 206 decides consumables that should be replaced on a visit date for a maintenance target apparatus. In Act 605, the maintenance scheduling unit 206 determines whether the components of the cartridge are included in a list of the consumables that should be replaced.

In the case of No in Act 605, i.e., if the components of the cartridge are not included in the consumables that should be replaced on the visit date, in Act 608, the maintenance scheduling unit 206 outputs the decided visit date and the list of the consumables that should be replaced on the visit date to the output device 25 or the terminal 26 in the LAN.

In the case of Yes in Act 605, i.e., if the components of the cartridge are included in the list of the consumables that should be replaced on the visit date, in Act 606, the maintenance scheduling unit 206 checks whether the decided visit date is before a date set in advance.

In the case of Yes in Act 606, i.e., the decided visit date is before the date set in advance, in Act 607, the maintenance scheduling unit 206 sets the visit date as a "cartridge replacement date" and registers the "cartridge replacement date" in the storing unit 205.

The MFP 201 downloads, during periodic communication, information concerning the "cartridge replacement date" stored in the storing unit 205 as additional information and displays a message of cartridge replacement on a not-shown control panel included in the MFP 201.

Consequently, it is possible that, concerning consumables that can be replaced on the user side, replacement work can be performed on the user side without requesting the visit of the serviceperson 202 and, concerning consumables for which replacement on the user side is difficult, the serviceperson 202 visits the user. It is possible to realized improvement of work efficiency of maintenance work.

Third Embodiment

A third embodiment of the present invention is explained below.

This embodiment is a modification of the first embodiment explained above and a basic system configuration of this embodiment is the same as that of the first embodiment. Components same as those already explained in the first embodiment are denoted by the same reference numerals and signs and explanation of the components is omitted.

In this embodiment, in the "visit date presenting mode", a calculation is periodically executed on all machines registered in advance.

The maintenance scheduling unit 206 has a schedule function periodically executed (e.g., at 6 o'clock everyday). The maintenance scheduling unit 206 executes the "visit date presenting mode" on all machines registered in the "machine" table 304 and updates the "visit schedule" table 311.

The serviceperson accesses the maintenance scheduling system 1 from the terminal 26 in the service center when a serviceperson comes to the office or from the outside using a mobile terminal 27 and inputs an ID of the serviceperson to inquire about a schedule of maintenance. The maintenance scheduling unit 206 collates the inputted ID with the "serviceperson. ID" of the "machine" table 304 and extracts all tuples of the "machine" table 304 matching the ID. The maintenance scheduling unit 206 further collates "IDs" of the extracted all tuples with the "machine. ID" of the "visit schedule" table 311 and extracts all tuples of the "visit schedule" table 311 matching the "IDs". The maintenance scheduling unit 206 retrieves a tuple having a closest "optimum visit date" out of the extracted all tuples and displays the "machine. ID", the "optimum visit date", and the "replacement consumable list" in the terminal 26 or the mobile terminal 27 as a screen shown in FIG. 16. If plural machines having the closest optimum visit date are present, the maintenance scheduling unit 206 displays one of the machines.

Figure 19:
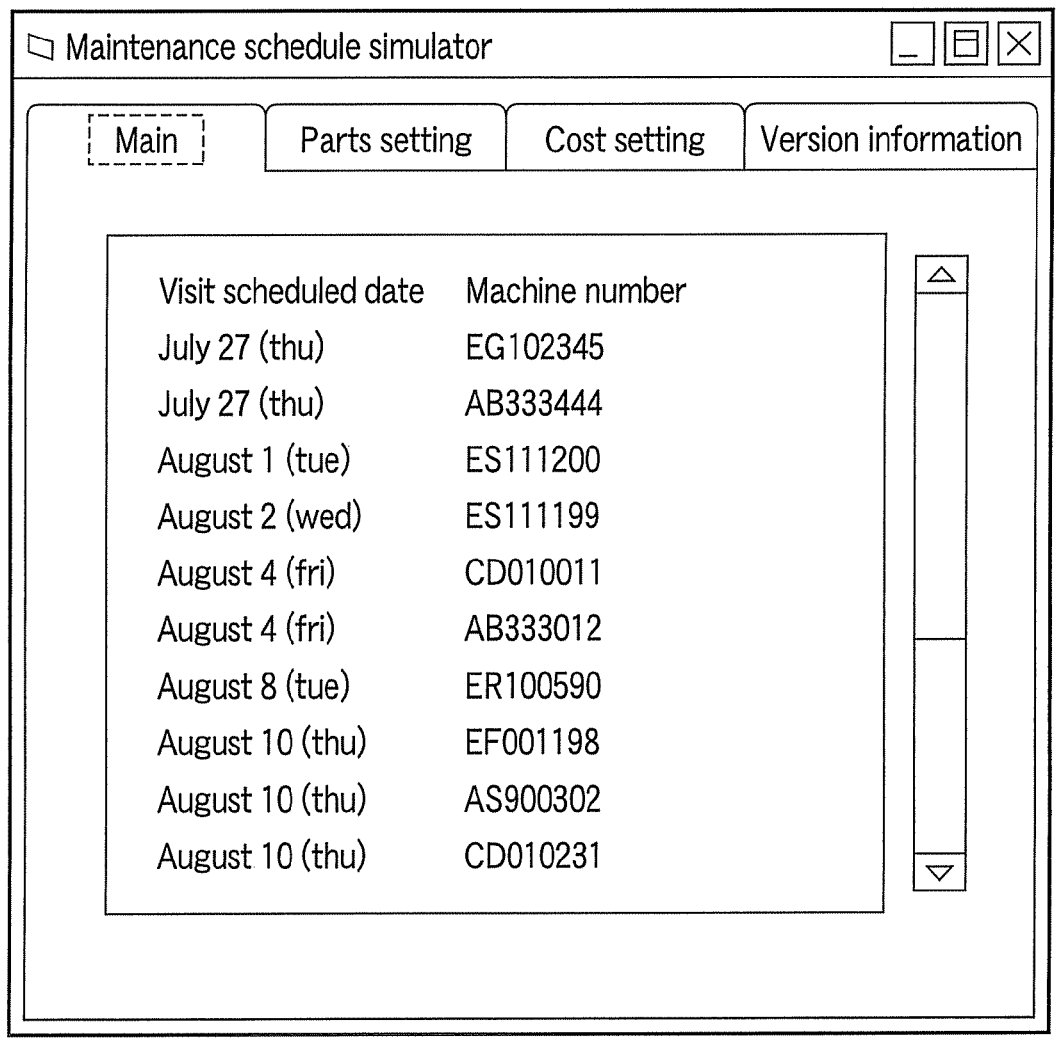
FIG. 19 is a diagram of an output result in the "visit date presenting mode"

If a request for a list of maintenance target machines in future is inputted from the serviceperson via the terminal 26 or the mobile terminal 27, in the same manner as above, the maintenance scheduling unit 206 extracts all tuples in the "visit schedule" table 311 associated with the ID of the serviceperson via the "machine" table 304. As shown in FIG. 19, the maintenance scheduling unit 206 displays a list of "machine. IDs" as maintenance targets on the terminal in order of "optimum visit dates".

Figure 20:
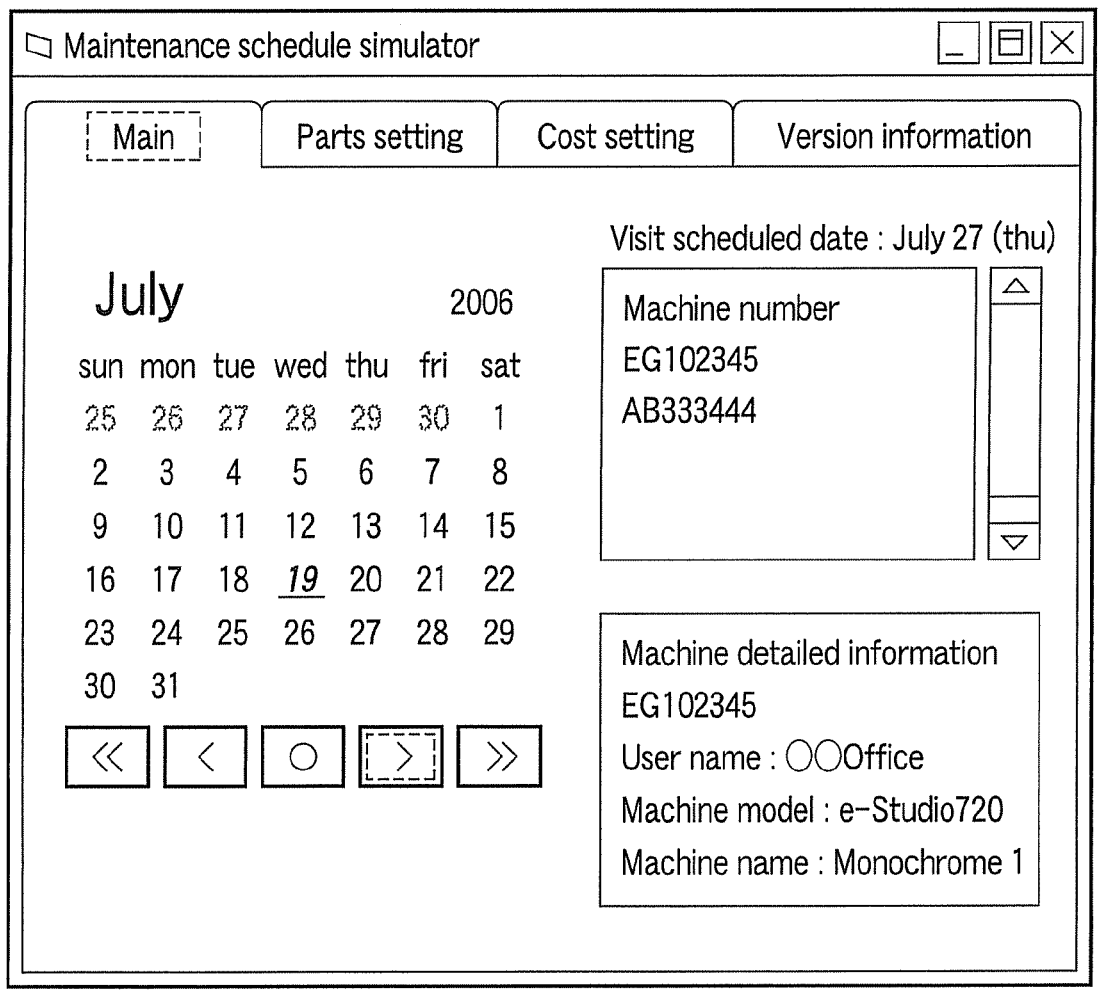
FIG. 20 is a diagram of an output result in the "visit date presenting mode"

If a request for a list of visit scheduled dates in future is inputted from the serviceperson via the terminal 26 or the mobile terminal 27, in the same manner as above, the maintenance scheduling unit 206 extracts all tuples in the "visit schedule" table 311 associated with the ID of the serviceperson via the "machine" table 304. As shown in FIG. 20, the maintenance scheduling unit 206 indicates "optimum visit dates" on a calendar. The maintenance scheduling unit 206 displays a list of "machine. IDs" on an "optimum visit date" scheduled in a nearest future and detailed information of one of the machines ("user. name", "machine model. name", "machine. name", etc.) associated with "machine. ID") on the terminal.

According to information concerning selection of the "optimum visit dates" and the "machine. IDs" inputted via an interface of the terminal (e.g., click on the screen), the maintenance scheduling unit 206 changes displayed contents of the list of "machine. IDs" and the detailed information. In the display of the list of maintenance target machines (FIG. 19) and the list of visit scheduled date (FIG. 20), according to information concerning selection of "machine. ID" inputted via the user interface of the terminal (e.g., double click on the screen), the maintenance scheduling unit 206 displays the replacement component list shown in FIG. 16.

In a small service center or the like, the display shown in FIGS. 16, 19, and 20 may be performed in service center units rather than in serviceperson units. In this case, the serviceperson inputs an ID of the service center to extract a "serviceperson. ID" list from the "serviceperson" table 310 and draw out information corresponding to the list in order of the "machine" table 304 and the "visit schedule" table 311.

Fourth Embodiment

A fourth embodiment of the present invention is explained below.

This embodiment is a modification of the first embodiment explained above and a basic system configuration of this embodiment is the same as that of the first embodiment. Components same as those already explained in the first embodiment are denoted by the same reference numerals and signs and explanation of the components is omitted.

In this embodiment, in the "strategy deciding mode", a "visit interval lower limit" and a "visit interval upper limit" are further calculated. The "strategy deciding mode" and the "visit date presenting mode" in this embodiment are explained below.

The maintenance scheduling unit 206 calculates and sets, for each of machines, a "visit interval", a "visit interval lower limit", a "visit interval upper limit", and a "replacement interval" for each of consumables. The serviceperson 202 performs maintenance work on the basis of the "visit interval", the "visit interval lower limit", the "visit interval upper limit", and the "replacement interval".

The serviceperson 202 checks, for the MFP 201 as a maintenance target machine, a range of visit dates calculated from the "visit interval lower limit" and the "visit interval upper limit" for each of the consumables and sets, as a visit date, a convenient date closest to an optimum visit date, which is calculated from the "visit interval", in the range. The serviceperson 202 replaces all consumables that reach the "replacement interval" at the time of this visit.

Figures 21, 22:
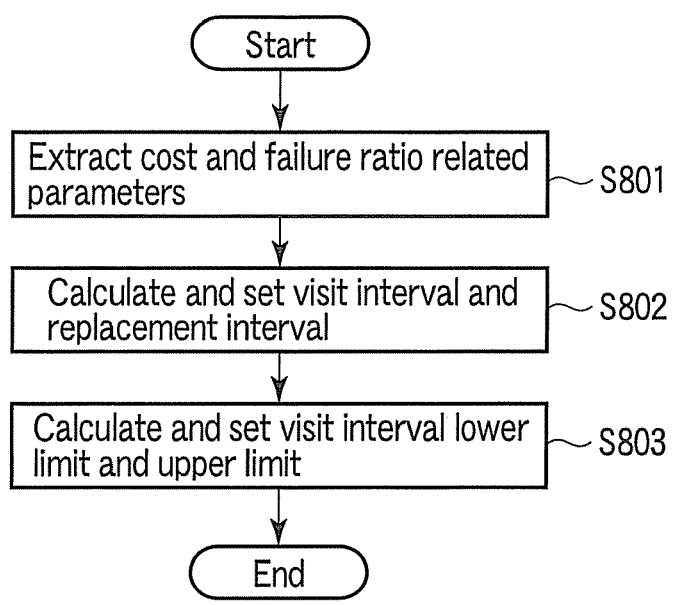
FIG. 21 is a diagram of an example of a "user and machine correspondence" table.
FIG. 22 is a flowchart of an overview of calculation of a "visit interval lower limit" and a "visit interval upper limit"

A method of calculating the "visit interval lower limit" and the "visit interval upper limit" is explained with reference to a flowchart shown in FIG. 22. A method of calculating the "visit interval" and the "replacement interval" is the same as that in the first embodiment. Therefore, explanation of Acts 801 and 802 is omitted.

Figures 23, 24:
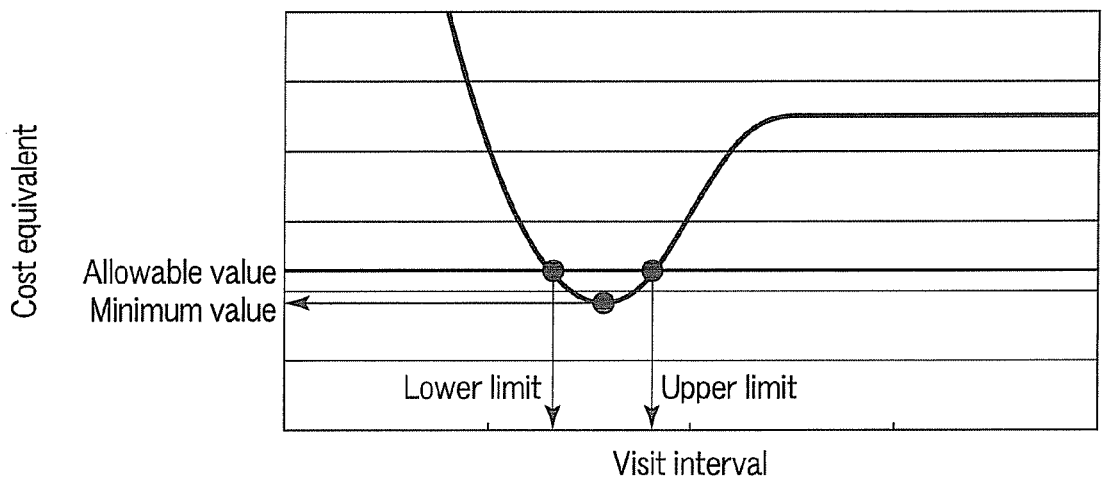
FIG. 23 is a graph for explaining a method of calculating the "visit interval lower limit" and the "visit interval upper limit"
FIG. 24 is a diagram of an example of information stored in the memory of the MFP.

In Act 803, the maintenance scheduling unit 206 calculates the "visit interval lower limit" and the "visit interval upper limit". FIG. 23 is a graph for explaining a method of calculating the "visit interval lower limit" and the "visit interval upper limit". As shown in FIG. 23, the maintenance scheduling unit 206 calculates an allowable value from a minimum value of a cost risk curve obtained by adding up cost and risk. The allowable value is a value obtained by multiplying the minimum value with a ratio set in advance (e.g., 1.05). The maintenance scheduling unit 206 calculates intersections of a straight line passing through this allowable value and parallel to the abscissa and a cost risk curve and sets the intersections as the "visit interval lower limit" and the "visit interval upper limit". Therefore, if the serviceperson 202 visits the user in a range between the "visit interval lower limit" and the "visit interval upper limit", a loss can be reduced to be equal to or smaller than the allowable value.

The maintenance scheduling unit 206 sets, for each of the consumables, the calculated "visit interval", "visit interval lower limit", "visit interval upper limit", and "replacement interval" in the "visit interval", the "visit interval lower limit", the "visit interval upper limit", and the "replacement interval" of the "consumable state" table 308.

The MFP 201 downloads, during periodic communication, the "visit interval", the "visit interval lower limit", the "visit interval upper limit", and the "replacement interval" of the "consumable state" table 308 as additional information and sets the "visit interval", the "visit interval lower limit", the "visit interval upper limit", and the "replacement interval" in the memory of the MFP 201. Therefore, the MFP 201 can present the "visit interval", the "visit interval lower limit", the "visit interval upper limit", and the "replacement interval", which are optimum strategies, to the user on the display panel of the MFP 201. FIG. 24 is a diagram of an example of information stored in the memory of the MFP 201.

The "visit date presenting mode" is explained. In the "visit date presenting mode", it is assumed that the serviceperson 202 checks the next visit date, i.e., timing for visiting a user of an apparatus everyday.

The desirable "visit interval", "visit interval lower limit", "visit interval upper limit", and "replacement interval" are set in advance by the "strategy deciding mode". The serviceperson 202 checks the next visit date by inputting "machine. ID" of a machine handled by the serviceperson 202 from the input device 24 provided in the service center 203 or inputting "machine. ID" from the terminal 26 in the LAN.

Figure 25:
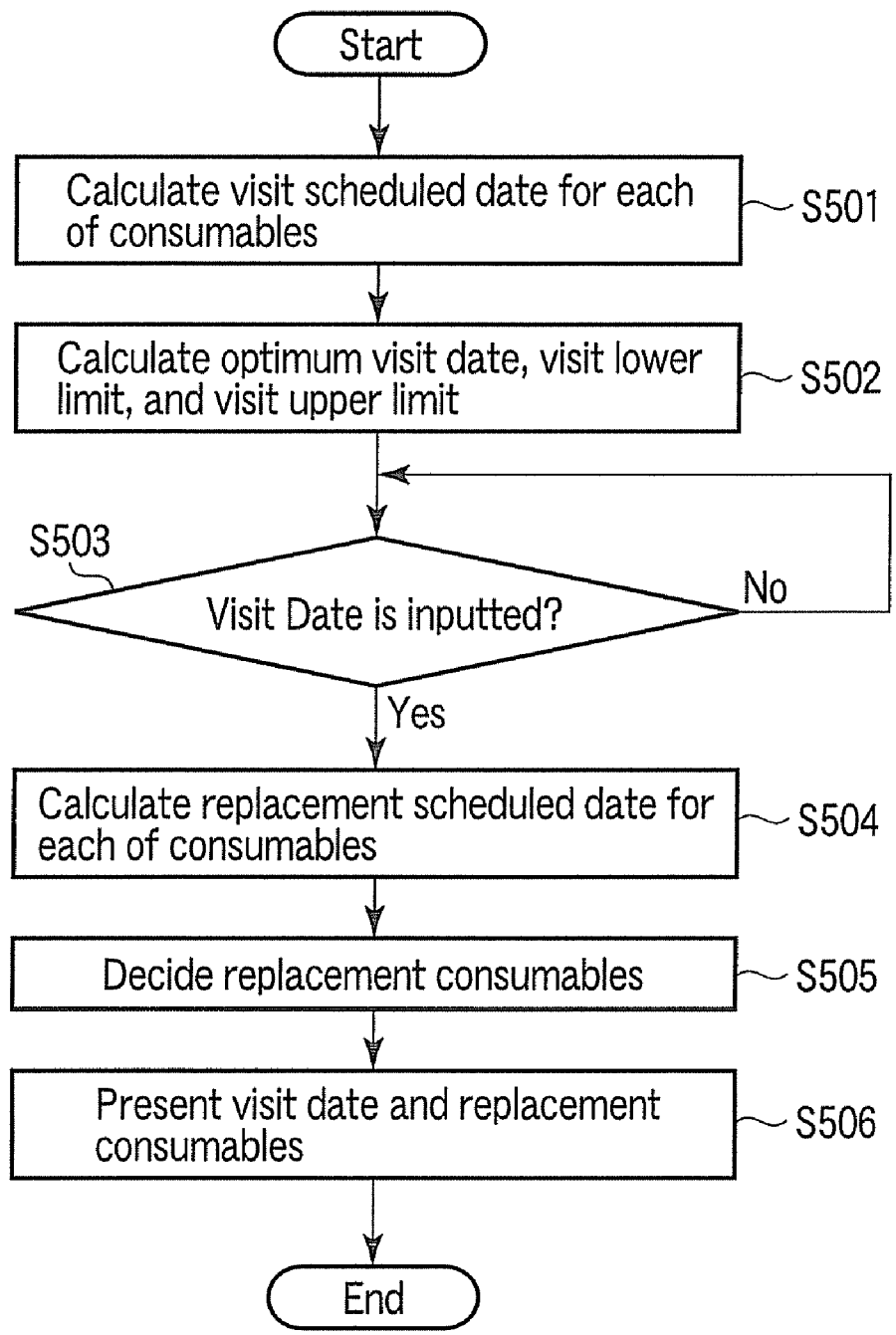
FIG. 25 is a flowchart of a schematic processing procedure of a "visit date presenting mode"

FIG. 25 is a flowchart of a schematic processing procedure of the visit date presenting mode.

The maintenance scheduling unit 206 collates the "ID" of the "machine" table 304 with the "machine. ID" of the "consumable state" table 308. The maintenance scheduling unit 206 extracts all "consumable state" tables 308 having the "machine. ID" matching the "ID" and refers to the "life counter acquisition date", the "life counter", the "life counter progress degree average", the "visit interval", the "visit interval lower limit", the "visit interval upper limit", and the "replacement interval".

In Act 501, the maintenance scheduling unit 206 calculates, for each of consumables, the next visit scheduled date. The next visit scheduled date is the same as that represented by Formula (2) explained in the first embodiment.

$$\text{Visit scheduled date} = \text{life counter acquisition date} + (\text{visit interval} - \text{life counter})/\text{life counter progress degree average} \quad (2)$$

In Act 502, the maintenance scheduling unit 206 decides, as an optimum visit date, a nearest visit scheduled date among visit scheduled dates for the consumables. The maintenance scheduling unit 206 further calculates a visit date lower limit and a visit date upper limit from the consumable corresponding to the optimum visit date. The visit date lower limit and the visit date upper limit are represented by Formulas (4) and (5).

$$\text{Visit date lower limit} = \text{life counter acquisition date} + (\text{visit interval lower limit} - \text{life counter})/\text{life counter progress degree average} \quad (4)$$

$$\text{Visit date upper limit} = \text{life counter acquisition date} + (\text{visit interval upper limit} - \text{life counter})/\text{life counter progress degree average} \quad (5)$$

The maintenance scheduling unit 206 presents the calculated optimum visit date, visit date lower limit, and visit date upper limit to the serviceperson 202. FIG. 26 is a diagram of an example of a display screen.

In Act 503, the maintenance scheduling units 206 waits for an input of a visit date from the serviceperson 202 (No in Act 503). The serviceperson 202 inputs, as the visit date, a convenient date closest to the optimum visit date in the presented range. When the serviceperson 202 inputs the visit date (Yes in Act 503), in Act 504, the maintenance scheduling unit 206 calculates replacement scheduled dates for all the consumables. The replacement scheduled date is represented by Formula (3).

$$\text{Replacement scheduled date} = \text{life counter acquisition date} + (\text{replacement interval} - \text{life counter})/\text{life counter progress degree average} \quad (3)$$

In Act 505, the maintenance scheduling unit 206 decides the consumables, the replacement scheduled dates for which are closer than the visit date, as replacement consumables. The maintenance scheduling unit 206 stores these calculation results in the "visit schedule" table 311. FIG. 30 is a diagram of an example of the "visit schedule" table 311 after update. The maintenance scheduling unit 206 stores the inputted "machine. ID" in the "machine. ID", stores the inputted visit date in the "visit scheduled date", stores the calculated optimum visit date, visit date lower limit, and visit date upper limit in the "optimum visit date", the "visit date lower limit", and the "visit date upper limit", and stores the calculated replacement consumables in the "replacement consumable list" of the "visit schedule" table 311.

In Act 506, the maintenance scheduling unit 206 presents, in the output device 25 or the terminal 26 in the LAN, the consumable to be replaced together with the visit date. An example of an output result in the visit date presenting mode is shown in FIG. 27.

Fifth Embodiment

A fifth embodiment of the present invention is explained below.

This embodiment is a modification of the first embodiment explained above. A basic system configuration of this embodiment is the same as that of the first embodiment. Components same as those already explained in the first embodiment are denoted by the same reference numerals and signs and explanation of the components is omitted.

This embodiment is carried out in the "strategy deciding mode" when there is almost no moving time among maintenance target MFPs, for example, when the same user uses plural MFPs. Maintenance schedules for the plural MFPs are simultaneously optimized.

The "strategy deciding mode" in this embodiment is explained.

The maintenance scheduling unit 206 refers to the "user and machine correspondence" table 306 in order to extract machines set in the same location. An example of the "user and machine correspondence" table 306 is shown in FIG. 21. The maintenance scheduling unit 206 extracts all tuples collated in "user. ID" of the "user and machine correspondence" table 306 and obtains a list of "machine. IDs". The maintenance scheduling unit 206 calculates and sets, for each of the machines, a "visit interval", a "visit interval lower limit", a "visit interval upper limit", and a "replacement interval" for each of consumables. The serviceperson 202 performs maintenance work on the basis of the "visit interval", the "visit interval lower limit", the "visit interval upper limit", and the "replacement interval".

The serviceperson 202 checks, for the MFPs 201 as maintenance target machines set in the same location, a range of visit dates calculated from the "visit interval lower limit" and the "visit interval upper limit" for each of the consumables and sets a convenient date closest to an optimum visit date calculated from the "visit interval" in the range. The serviceperson 202 replaces all the consumables that reach the "replacement interval" at the time of this visit.

Figure 28:
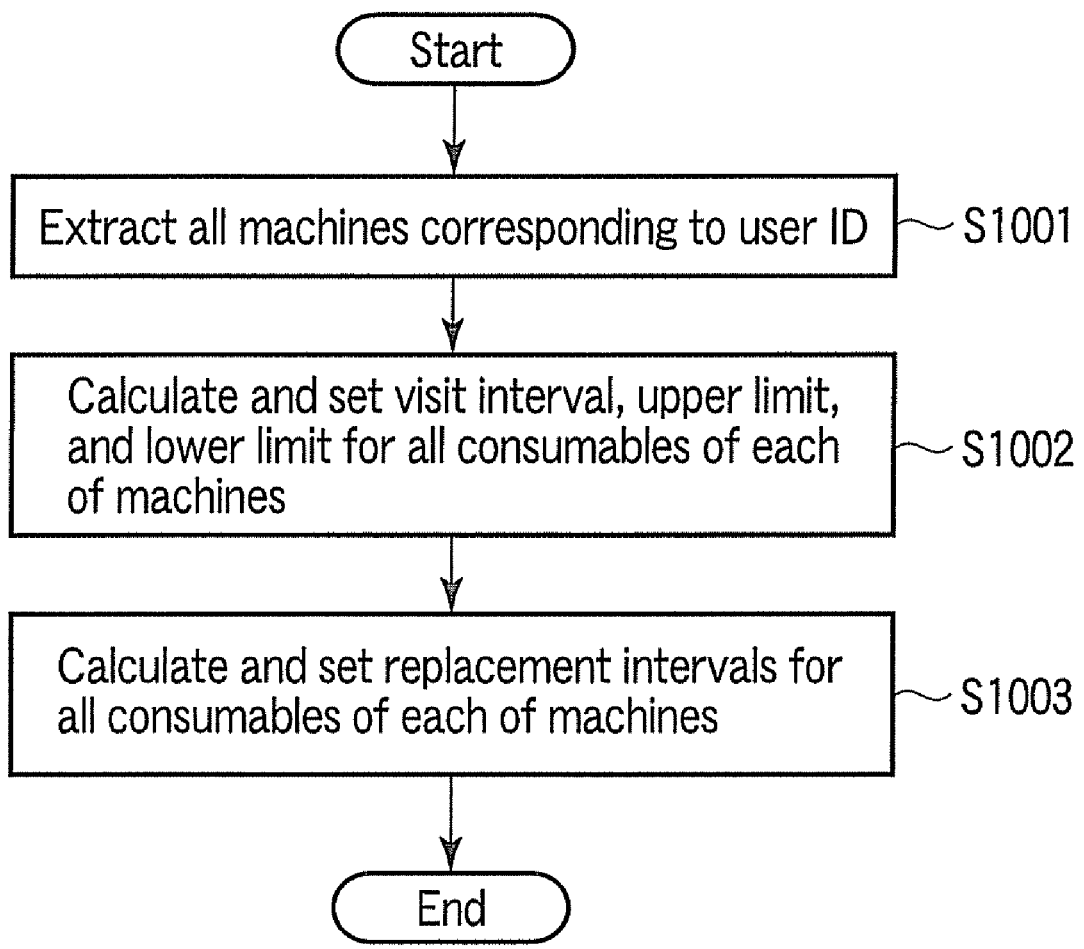
FIG. 28 is a flowchart of a schematic procedure for calculation of a "visit interval", a "visit interval lower limit", a "visit interval upper limit", and a "replacement interval"

A method of calculating the "visit interval", the "visit interval lower limit", the "visit interval upper limit", and the "replacement interval" for, for example, a user having a user ID A00012 is explained in detail with reference to a flowchart shown in FIG. 28.

In Act 1001, the maintenance scheduling unit 206 extracts all tuples, "user. ID" of which corresponds to "A00012", from the "user and machine correspondence" table shown in FIG. 21 and extracts three machines, "machine. ID" of which is "100213", "100214", and "101501", as an MFP group set in the same location. In Act 1002, as in the first embodiment, the maintenance scheduling unit 206 calculates, for each of consumables of the machine, "machine. ID" of which is "1000213", a cost risk curve on the basis of a failure ratio distribution and predetermined cost and risk and calculates a "visit interval" at which a total of cost and risk is minimized. Moreover, as in the first embodiment, the maintenance scheduling unit 206 sets, as an allowable value, a value obtained by multiplying a minimum value of the cost risk curve with a ratio set in advance (e.g., 1.05) and calculates intersections with the cost risk curve. The maintenance scheduling unit 206 calculates the intersections as the "visit interval lower limit" and the "visit interval upper limit" and sets, for each of the consumables, the visit interval", the "visit interval lower limit", and the "visit interval upper limit" in the "visit interval", the "visit interval lower limit", and the "visit interval upper limit" of the "consumable state" table 308. Similarly, the maintenance scheduling unit 206 calculates, for each of consumables of the two machines, "machine. ID" of which is "100214 and "101501", the "visit interval", the "visit interval lower limit", and the "visit interval upper limit" and sets, for each of the consumables, the "visit interval", the "visit interval lower limit", and the "visit interval upper limit" in the "visit interval", the "visit interval lower limit", and the "visit interval upper limit" of the "consumable state" table 308.

In Act 1003, the maintenance scheduling unit 206 calculates, for each of the consumables of the machine, "machine. ID" of which is "1000213", a revisit cost curve and a PM generated cost curve and calculates the "replacement interval" with the other consumables, "machine. ID" of which is "100213, and all the consumables, "machine. ID" of which is "100214" and "101501", set as targets. The maintenance scheduling unit 206 sets, for each of the consumables, the calculated "replacement interval" in the "replacement interval" of the "consumable state" table 308.

Similarly, the maintenance scheduling unit 206 calculates, for each of the consumables of the machine, "machine. ID" of which is "100214", the "replacement interval" from a revisit cost curve and a PM generated cost curve with the other consumables, "machine. ID" of which is "100214", and all the consumables, "machine. ID" of which is "100213" and "101501", as targets. The maintenance scheduling unit 206 calculates, for each of the consumables of the machine, "machine. ID" of which is "101501", the "replacement interval" from a revisit cost curve and a PM generated cost curve with the other consumables, "machine. ID" of which is "101501", and all the consumables, "machine. ID" of which is "100213" and "100214", as targets. The maintenance scheduling unit 206 sets, for each of the consumables, the calculated "replacement interval" in the "replacement interval" of the "consumable state" table 308.

The MFPs 201 downloads, during periodic communication, the "visit interval", the "visit interval lower limit", the "visit interval upper limit", and the "replacement interval" of the "consumable state" table 308 as additional information and sets the "visit interval", the "visit interval lower limit", the "visit interval upper limit", and the "replacement interval" in memories of the MFPs 201. Therefore, the MFPs 201 can present the "visit interval", the "visit interval lower limit", the "visit interval upper limit", and the "replacement interval", which are optimum strategies, to users on display panels of the MFPs 201. FIG. 24 is a diagram of an example of information stored in the memories of the MFPs 201.

The "visit date presenting mode" is explained. In the "visit date presenting mode", it is assumed that the serviceperson 202 checks the next visit date, i.e., timing for visiting a user of an apparatus everyday.

The desirable "visit interval", "visit interval lower limit", "visit interval upper limit", and "replacement interval" are set in advance by the "strategy deciding mode". The serviceperson 202 checks the next visit date by inputting "user. ID" of a user handled by the serviceperson 202 from the input device 24 provided in the service center 203 or inputting "machine. ID" from the terminal 26 in the LAN.

Figure 29:
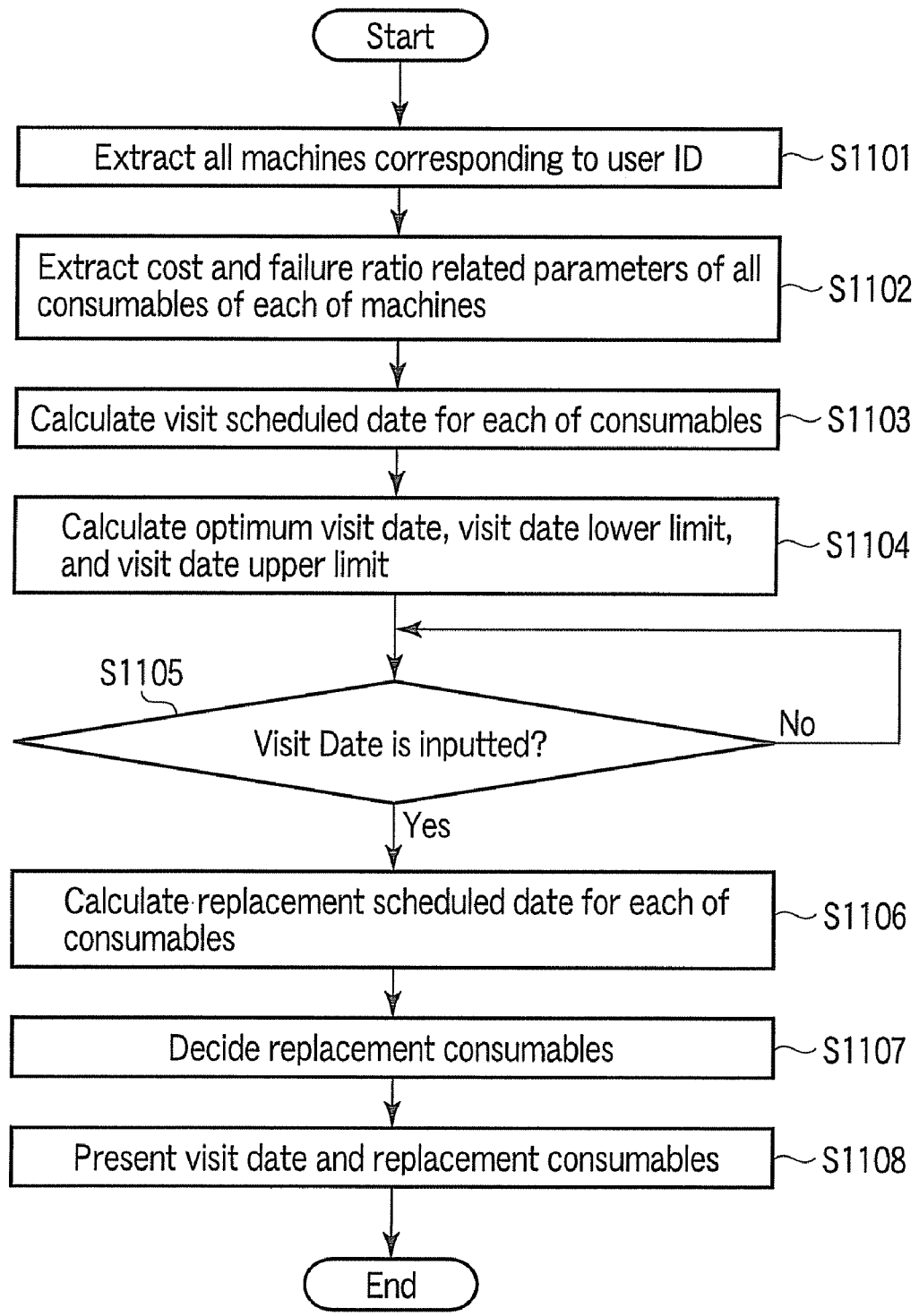
FIG. 29 is a flowchart of a schematic processing procedure of a "visit date presenting mode"

FIG. 29 is a flowchart of a schematic processing procedure of the visit date presenting mode.

In Act 1101, the maintenance scheduling unit 206 collates "user. ID" inputted by a serviceperson with the "user. ID" of the "user and machine correspondence" table 306. The maintenance scheduling unit 206 extracts all "user and machine correspondence" tables 306 having the "user. IDs" matching the inputted "user. ID" and obtains "machine. ID". Moreover, in Act 1102, the maintenance scheduling unit 206 collates the extracted all "machine. IDs" with the "machine. ID" of the "consumable state" table 308. The maintenance scheduling unit 206 extracts all "consumable state" tables 308 having the "machine. IDs" matching the "machine. ID" and refers to the "life counter acquisition date", the "life counter", the "life counter progress degree average", the "visit interval", the "visit interval lower limit", the "visit interval upper limit", and the "replacement interval".

In Act 1103, the maintenance scheduling unit 206 calculates, for all the consumables of each of the maintenance target machines set in the same location, the next visit scheduled date. The next visit scheduled date is the same as that represented by Formula (2) explained in the first embodiment.

$$\text{Visit scheduled date} = \text{life counter acquisition date} + (\text{visit interval} - \text{life counter})/\text{life counter progress degree average} \quad (2)$$

In Act 1104, the maintenance scheduling unit 206 decides, as an optimum visit date, a nearest visit scheduled date among visit scheduled dates for the all consumables of each of the machines. The maintenance scheduling unit 206 further calculates a visit date lower limit and a visit date upper limit from the consumables corresponding to the optimum visit date. The visit date lower limit and the visit date upper limit are represented by Formulas (4) and (5).

$$\text{Visit date lower limit} = \text{life counter acquisition date} + (\text{visit interval lower limit} - \text{life counter})/\text{life counter progress degree average} \quad (4)$$

$$\text{Visit date upper limit} = \text{life counter acquisition date} + (\text{visit interval upper limit} - \text{life counter})/\text{life counter progress degree average} \quad (5)$$

The maintenance scheduling unit 206 presents the calculated optimum visit date, visit date lower limit, and visit date upper limit to the serviceperson 202. FIG. 26 is a diagram of an example of a display screen.

In Act 1105, the maintenance scheduling unit 206 waits for an input of a visit date from the serviceperson 202 (No in Act 1105). The serviceperson 202 inputs, as the visit date, a convenient date closest to the optimum visit date in the presented range. When the serviceperson 202 inputs the visit date (Yes in Act 1105), in Act 1106, the maintenance scheduling unit 206 calculates replacement scheduled dates for all the consumables of each of the maintenance target machines set in the same location. The replacement scheduled date is represented by Formula (3).

$$\text{Replacement scheduled date} = \text{life counter acquisition date} + (\text{replacement interval} - \text{life counter})/\text{life counter progress degree average} \quad (3)$$

In Act 1107, the maintenance scheduling unit 206 decides the consumables, the replacement scheduled dates for which are closer than the visit date, as replacement consumables. The maintenance scheduling unit 206 stores these calculation results in the "visit schedule" table 311. The maintenance scheduling unit 206 stores the extracted "machine. ID" in the "machine. ID", stores the inputted visit date in the "visit scheduled date", stores the calculated optimum visit date, visit date lower limit, and visit date upper limit in the "optimum visit date", the "visit date lower limit", and the "visit date upper limit", and stores the replacement consumables in the "replacement consumable list" of the "visit schedule" table 311. FIG. 30 is a diagram of an example of the "visit schedule" table 311 after update. In Act 1108, the maintenance scheduling unit 206 presents, in the output device 25 or the terminal 26 in the LAN, the consumable to be replaced together with the visit date. An example of an output result in the visit date presenting mode is shown in FIG. 31.

In the explanation of this embodiment, the same user uses the plural MFPs. However, the present invention is not limited to this. When there is almost no moving time among separate users or, conversely, when the same user uses plural MFPs in distant locations, an ID may be prepared in the "user" table 301 for each of groups of the MFPs that can be collected in the same location and a visit date may be calculated for each of the groups.

In the explanation of the five embodiments, the functions for carrying out the invention are recorded in advance in the apparatus. However, the present invention is not limited to this. The same functions may be downloaded to the apparatus from a network or a recording medium having the same functions recorded therein may be installed in the apparatus. A form of the recording medium may be any form as long as the recording medium is a recording medium such as a CD-ROM that can store programs and can be read by the apparatus. The functions obtained in advance by install or download in this way may be realized in cooperation with an operating system (OS) or the like in the apparatus.

As explained above, according to the embodiments, since the two determination criteria, i.e., the "visit interval" and the "replacement interval", are set for each of the consumables, the serviceperson can grasp "when the serviceperson should visit a user" and "which consumable should be replaced". Moreover, since the "visit interval lower limit" and the "visit interval upper limit" are set by taking into account allowable cost and presented as a period, it is possible to more flexibly lay out a visit schedule of the serviceperson.

A desirable visit interval and a desirable replacement interval (strategies) are calculated in advance by using the "strategy deciding mode" and, usually, the next visit date is calculated on the basis of the decided strategies by using the "visit date presenting mode". Therefore, it is possible to reduce cost for the calculation.

Since a state of use of a maintenance target apparatus can be collected on a real time basis by using the communicating unit, the accuracy of prediction of a date of visit to a user of the apparatus is remarkably improved. Further, since it is possible to record whether a consumable is replaced because the consumable reaches the end of durable life, it is possible to accurately estimate a failure probability distribution.

Since a life counter value corresponding to a physical amount effective for grasping a degree of deterioration of each of consumables is used, it is possible to more accurately estimate a failure ratio distribution.

Since a list of orders of visit scheduled date for target machines and a schedule on a calendar can be checked for each of servicepersons and service centers, the serviceperson can grasp a job volume in a short term and adjust the schedule.

For MFPs set in the same location such as in user units, an optimum maintenance schedule is laid out by taking into account not only a state of one MFP but also states of the other MFPs.

The present invention is explained in detail above by way of the specific forms. However, it would be obvious for those skilled in the art that various alterations and modifications can be made without departing from the spirit and the scope of the present invention. As explained above in detail, according to the present invention, it is possible to provide a technique that can reduce cost for a maintenance job and reduce downtime of a product.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A maintenance scheduling system that lays out a maintenance schedule for an image forming apparatus that forms an image and exchanges information with an external apparatus, the maintenance scheduling system comprising:
a memory; and
a processor, wherein the processor is configured to execute the following instructions:
instructions for acquiring actual use result information of consumables;
instructions for estimating failure probability distributions of the consumables on the basis of a history of the actual use result information of the consumables;
instructions for acquiring cost related constants of the consumables;
instructions for setting a visit interval value representing a time interval of visit for maintenance work for the consumables to plural values and calculating, for each of the plural visit interval values, cost per unit time required for the image forming apparatus on the basis of the failure probability distributions, the history of the actual use result information, and the cost related constants of the consumables;
instructions for calculating, on the basis of the cost calculated by the first cost calculating unit, the visit interval value giving minimum cost as a minimum cost visit interval value;
instructions for setting a replacement interval value representing a time interval for replacement of the consumables to plural values and calculating, for each of the plural replacement interval values, cost per unit time required for the image forming apparatus on the basis of the failure probability distributions, the history of the actual use result information, and the cost related constants of the consumables;
instructions for calculating a calculated replacement interval value on the basis of the cost calculated by the second cost calculating unit; and
instructions for presenting next visit time and at least one of the consumables to be replaced in the visit on the basis of the minimum cost visit interval value and the calculated replacement interval value.

2. The system according to claim 1, wherein the actual use result information includes counter values of physical amounts related to degrees of deterioration of the consumables at the time of replacement of the consumables, acquisition dates of the counter values, and life information indicating whether the consumables are replaced because the consumables reach end of durable life.

3. The system according to claim 1, wherein the consumables include a cartridge in which plural consumables having functions different from one another are integrated as a unit.

4. The system according to claim 1, wherein
the instructions for calculating the visit interval value further includes:
instructions for calculating an allowable value of cost on the basis of the minimum cost; and
instructions for calculating an upper limit value and a lower limit value of the visit interval on the basis of the allowable value,
the instructions for presenting next visit time further includes:
instructions for presenting next visit time as a recommended period on the basis of the minimum cost visit interval value, the lower limit value of the visit interval, and the upper limit value of the visit interval; and
instructions for acquiring desired visit time inputted in response to the presentation, and
instructions for presenting, on the basis of the desired visit time and the calculated replacement interval value, the next visit time and at least one of the consumables to be replaced in the next visit.

5. The system according to claim 4, wherein the instructions for presenting next visit time further selects a consumable having a calculated replacement interval value smaller than the desired visit time as the consumable to be replaced at the time of the next visit.

6. The system according to claim 5, wherein the actual use result information of the consumables includes counter values of physical amounts related to degrees of deterioration of the consumables at the time of replacement of the consumables, acquisition dates of the counter values, and life information indicating whether the consumables are replaced because the consumables reach end of durable life.

7. The system according to claim 5, wherein the consumables include a cartridge in which plural consumables having functions different from one another are integrated as a unit.

8. The system according to claim 1, wherein the cost related constants of the consumables include unit costs and replacement times of the consumables, work expenses per unit time and moving time of a serviceperson, and a loss of a user per unit time due to unavailability of the image forming apparatus.

9. A maintenance method for laying out a maintenance schedule for an image forming apparatus that forms an image and exchanges information with an external apparatus, the maintenance method comprising:
acquiring actual use result information of consumables;
estimating, by a computer processor, failure probability distributions of the consumables on the basis of a history of the actual use result information of the consumables;
acquiring cost related constants of the consumables;
setting, by the computer processor, a visit interval value representing a time interval of visit for maintenance work for the consumables to plural values and calculating, for each of the plural visit interval values, cost per unit time required for the image forming apparatus on the basis of the failure probability distributions, the history of the actual use result information, and the cost related constants of the consumables;
calculating, by the computer processor, on the basis of the cost calculated for each of the plural visit interval values, the visit interval value giving minimum cost as a minimum cost visit interval value;
setting a replacement interval value representing a time interval for replacement of the consumables to plural values and calculating, for each of the plural replacement interval values, cost per unit time required for the image forming apparatus on the basis of the failure probability distributions, the history of the actual use result information, and the cost related constants of the consumables;
calculating, by the computer processor, a calculated replacement interval value on the basis of the cost calculated for each of the plural replacement interval values; and
presenting next visit time and at least one of the consumables to be replaced in the visit on the basis of the minimum cost visit interval value and the calculated replacement interval value.

10. The method according to claim 9, wherein the actual use result information includes counter values of physical amounts related to degrees of deterioration of the consumables at the time of replacement of the consumables, acquisition dates of the counter values, and life information indicating whether the consumables are replaced because the consumables reach end of durable life.

11. The method according to claim 9, wherein the consumables include a cartridge in which plural consumables having functions different from one another are integrated as a unit.

12. The method according to claim 9, further comprising:
calculating an allowable value of cost on the basis of the minimum cost;
calculating an upper limit value and a lower limit value of the visit interval on the basis of the allowable value,
presenting next visit time as a recommended period on the basis of the minimum cost visit interval value, the lower limit value of the visit interval, and the upper limit value of the visit interval;
acquiring desired visit time inputted in response to the presentation; and
presenting, on the basis of the desired visit time and the calculated replacement interval value, the next visit time and at least one of the consumables to be replaced in the next visit.

13. The method according to claim 12, wherein the presenting the consumable is presenting a consumable having a calculated replacement interval value smaller than the desired visit time as the consumable to be replaced at the time of the next visit.

14. The method according to claim 13, wherein the actual use result information of the consumables includes counter values of physical amounts related to degrees of deterioration of the consumables at the time of replacement of the consumables, acquisition dates of the counter values, and life information indicating whether the consumables are replaced because the consumables reach end of durable life.

15. The method according to claim 13, wherein the consumables include a cartridge in which plural consumables having functions different from one another are integrated as a unit.

16. The method according to claim 9, wherein the cost related constants of the consumables include unit costs and replacement times of the consumables, work expenses per unit time and moving time of a serviceperson, and a loss of a user per unit time due to unavailability of the image forming apparatus.

17. An image forming apparatus that forms an image and exchanges information with an external apparatus, the image forming apparatus comprising:
a storage device that stores actual use result information of consumables; and
an information transmitting device that transmits the actual use result information of the consumables to a maintenance scheduling system that lays out a maintenance schedule for the image forming apparatus, wherein
the maintenance scheduling system includes a processor configured to execute the following instructions:
instructions for acquiring actual use result information of consumables;
instructions for estimating failure probability distributions of the consumables on the basis of a history of the actual use result information of the consumables;
instructions for acquiring cost related constants of the consumables;
instructions for setting a visit interval value representing a time interval of visit for maintenance work for the consumables to plural values and calculating, for each of the plural visit interval values, cost per unit time required for the image forming apparatus on the basis of the failure probability distributions, the history of the actual use result information, and the cost related constants of the consumables;
instructions for calculating, on the basis of the cost calculated by the first cost calculating unit, the visit interval value giving minimum cost as a minimum cost visit interval value;
instructions for setting a replacement interval value representing a time interval for replacement of the consumables to plural values and calculating, for each of the plural replacement interval values, cost per unit time required for the image forming apparatus on the basis of the failure probability distributions, the history of the actual use result information, and the cost related constants of the consumables;
instructions for calculating a calculated replacement interval value on the basis of the cost calculated by the second cost calculating unit; and
instructions for presenting next visit time and at least one of the consumables to be replaced in the visit on the basis of the minimum cost visit interval value and the calculated replacement interval value.

18. The apparatus according to claim 17, wherein the actual use result information includes counter values of physical amounts related to degrees of deterioration of the consumables at the time of replacement of the consumables, acquisition dates of the counter values, and life information indicating whether the consumables are replaced because the consumables reach end of durable life.

19. The apparatus according to claim 17, wherein the consumables include a cartridge in which plural consumables having functions different from one another are integrated as a unit.

* * * * *

UNITED STATES PATENT AND TRADEMARK OFFICE
CERTIFICATE OF CORRECTION

PATENT NO. : 8,099,310 B2  Page 1 of 1
APPLICATION NO. : 12/370137
DATED : January 17, 2012
INVENTOR(S) : Yoshikatsu Kamisuwa et al.

It is certified that error appears in the above-identified patent and that said Letters Patent is hereby corrected as shown below:

On the title page item (75) Inventors:

Yoshikatsu Kumisuwa

It should read:

(75) Inventors:

Yoshikatsu Kamisuwa

Signed and Sealed this
Twentieth Day of March, 2012

David J. Kappos
*Director of the United States Patent and Trademark Office*